United States Patent
Yokokawa

(10) Patent No.: US 10,521,947 B2
(45) Date of Patent: Dec. 31, 2019

(54) RENDERING OF VIRTUAL HAND POSE BASED ON DETECTED HAND INPUT

(71) Applicant: Sony Interactive Entertainment Inc., Tokyo (JP)

(72) Inventor: Yutaka Yokokawa, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 15/721,651

(22) Filed: Sep. 29, 2017

(65) Prior Publication Data
US 2019/0102927 A1  Apr. 4, 2019

(51) Int. Cl.
*G06T 13/40* (2011.01)
*G06F 3/01* (2006.01)
*G06F 3/0346* (2013.01)

(52) U.S. Cl.
CPC .............. *G06T 13/40* (2013.01); *G06F 3/012* (2013.01); *G06F 3/014* (2013.01); *G06F 3/017* (2013.01); *G06F 3/0346* (2013.01)

(58) Field of Classification Search
CPC ........ G06T 19/006; G06F 3/011; G06F 3/014; G06F 3/017; G06K 9/00335; G06K 9/00355; G06K 9/00362–00389
See application file for complete search history.

(56) References Cited

U.S. PATENT DOCUMENTS

| | | | | |
|---|---|---|---|---|
| 2012/0113223 A1* | 5/2012 | Hilliges | .................... | G06F 3/00 348/46 |
| 2012/0114255 A1* | 5/2012 | Kimura | .............. | G06K 9/00389 382/203 |
| 2012/0326966 A1* | 12/2012 | Rauber | ................. | G06F 1/1626 345/156 |
| 2013/0265220 A1* | 10/2013 | Fleischmann | ........... | G06F 3/011 345/156 |
| 2015/0161437 A1* | 6/2015 | Mazurenko | ........ | G06K 9/00389 382/103 |
| 2015/0187143 A1* | 7/2015 | Mere | ........................ | G06F 3/017 345/156 |

(Continued)

OTHER PUBLICATIONS

Wang, Robert Y., and Jovan Popovia. "Real-time hand-tracking with a color glove." ACM transactions on graphics (TOG) 28.3 (2009): 63. (Year: 2009).*

(Continued)

*Primary Examiner* — Daniel F Hajnik
(74) *Attorney, Agent, or Firm* — Penilla IP, APC

(57) ABSTRACT

In some implementations, a method is provided, including the following operations: receiving, from a controller device, controller input that identifies a pose of a user's hand; determining a degree of similarity of the controller input to a predefined target input; rendering in a virtual space a virtual hand that corresponds to the controller device, wherein when the degree of similarity exceeds a predefined threshold, then the virtual hand is rendered so that a pose of the virtual hand conforms to a predefined hand pose, and wherein when the degree of similarity does not exceed the predefined threshold, then the virtual hand is rendered so that the pose of the virtual hand dynamically changes in response to changes in the controller input.

21 Claims, 25 Drawing Sheets

(56) References Cited

U.S. PATENT DOCUMENTS

| | | | |
|---|---|---|---|
| 2015/0242101 A1* | 8/2015 | Ishino | G06K 9/00355 |
| | | | 715/776 |
| 2016/0054797 A1 | 2/2016 | Tokubo et al. | |
| 2016/0054798 A1* | 2/2016 | Messingher | G06F 3/012 |
| | | | 345/156 |

OTHER PUBLICATIONS

Zeiselmair, Sabine; Notification of Transmittal of the International Search Report and the Written Opinion of the International Searching Authority, or the Declaration; dated Feb. 13, 2019; 11 pages.

* cited by examiner

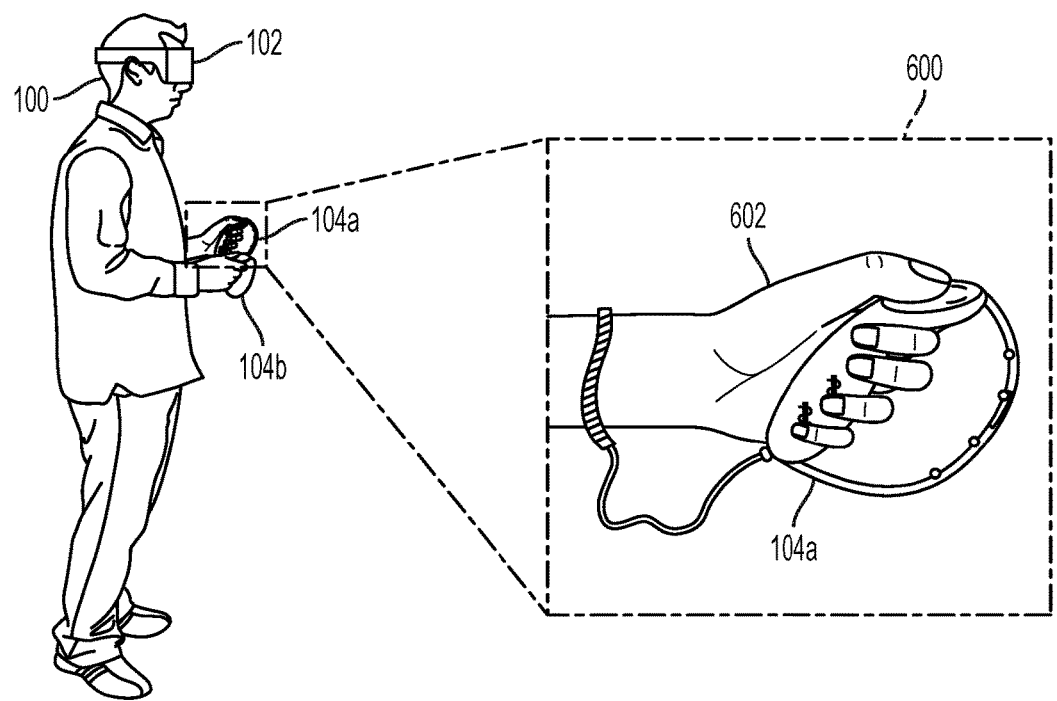
FIG. 6A
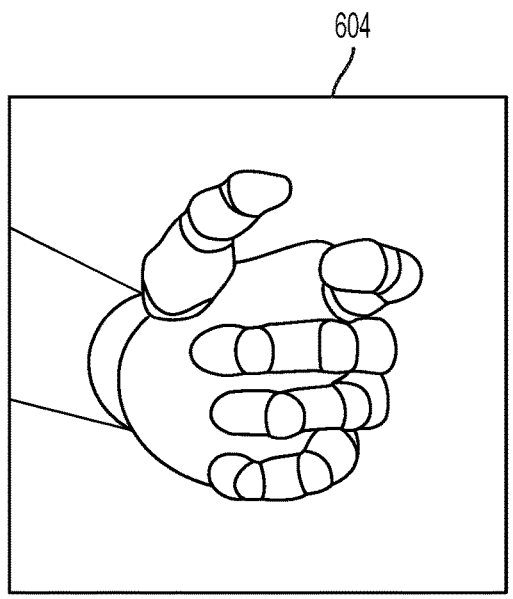 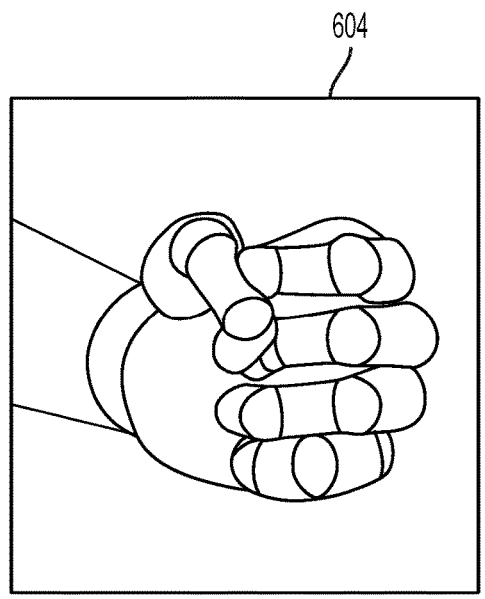
FIG. 6B  FIG. 6C

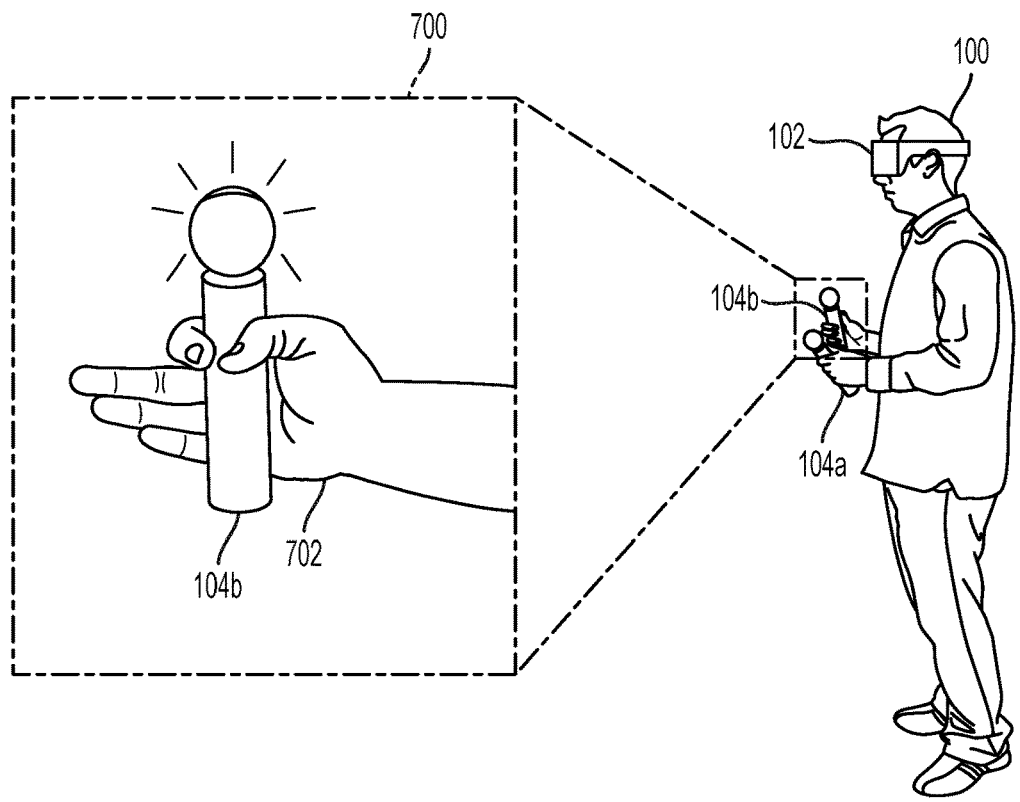
FIG. 7A
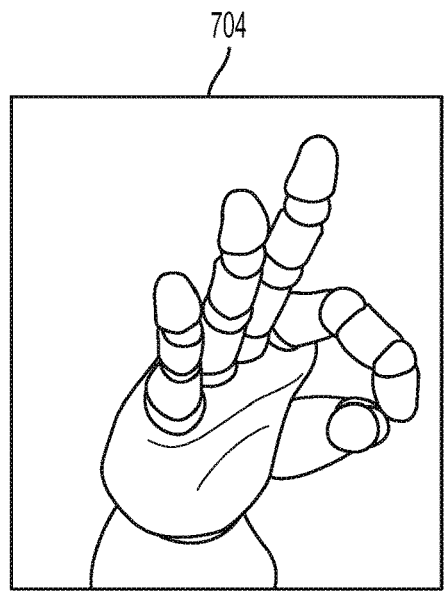 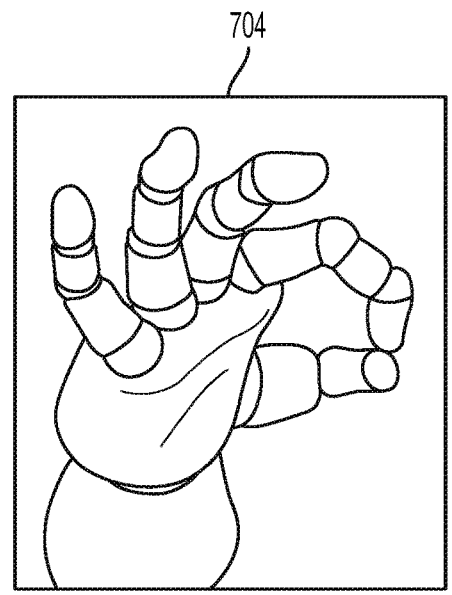
FIG. 7B  FIG. 7C

RENDERING OF VIRTUAL HAND POSE BASED ON DETECTED HAND INPUT

BACKGROUND

1. Field of the Disclosure

The present disclosure relates to rendering of virtual hand pose based on detected hand input.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), and Sony Playstation4® (PS4), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display (HMD). A head-mounted display is worn by the user and can be configured to present various graphics, such as a view of a virtual space. The graphics presented on a head-mounted display can cover a large portion or even all of a user's field of view. Hence, a head-mounted display can provide a visually immersive virtual reality experience to the user, as the HMD renders a three-dimensional real-time view of the virtual environment in a manner that is responsive to the user's movements. The user wearing an HMD is afforded freedom of movement in all directions, and accordingly can be provided a view of the virtual environment in all directions via the HMD.

It is in this context that implementations of the disclosure arise.

SUMMARY

Implementations of the present disclosure include devices, methods and systems relating to rendering of a virtual hand pose based on detected hand input.

In some implementations, a method is provided, comprising: receiving, from a controller device, controller input that identifies a pose of a user's hand; determining a degree of similarity of the controller input to a predefined target input; rendering in a virtual space a virtual hand that corresponds to the controller device, wherein when the degree of similarity exceeds a predefined threshold, then the virtual hand is rendered so that a pose of the virtual hand conforms to a predefined hand pose, and wherein when the degree of similarity does not exceed the predefined threshold, then the virtual hand is rendered so that the pose of the virtual hand dynamically changes in response to changes in the controller input.

In some implementations, the pose of the virtual hand is defined by postures of virtual fingers of the virtual hand, that are independent of a location and orientation of the virtual hand in the virtual space, wherein the predefined hand pose defines predefined postures for the virtual fingers of the virtual hand.

In some implementations, the postures of the virtual fingers are defined by amounts of one or more of flexion, extension, abduction, adduction, and/or circumduction of the virtual fingers.

In some implementations, rendering the virtual hand so that the pose of the virtual hand dynamically changes in response to changes in the controller input includes changing the posture of at least one virtual finger of the virtual hand in response to a change in the controller input.

In some implementations, the rendering of the predefined hand pose is maintained for a duration when the degree of similarity continues to exceed the predefined threshold, such that changes in the controller input that do not cause the degree of similarity to not exceed the predefined threshold do not result in changes in the pose of the virtual hand.

In some implementations, the pose of the user's hand is defined by postures of fingers of the user's hand, that are independent of a location and orientation of the user's hand in a local environment, and wherein the controller input identifies postures of fingers of the user's hand.

In some implementations, the postures of the fingers of the user's hand are defined by amounts of one or more of flexion, extension, abduction, adduction, and/or circumduction of the fingers of the user's hand.

In some implementations, a non-transitory computer readable medium having program instruction embodied thereon that, when executed by at least one computing device, cause said at least one computing device to perform a method including the following operations: receiving, from a controller device, controller input that identifies a pose of a user's hand; determining a degree of similarity of the controller input to a predefined target input; rendering in a virtual space a virtual hand that corresponds to the controller device, wherein when the degree of similarity exceeds a predefined threshold, then the virtual hand is rendered so that a pose of the virtual hand conforms to a predefined hand pose, and wherein when the degree of similarity does not exceed the predefined threshold, then the virtual hand is rendered so that the pose of the virtual hand dynamically changes in response to changes in the controller input.

In some implementations, a system is provided, comprising: a controller device that generates controller input that identifies a pose of a user's hand; a computing device that determines a degree of similarity of the controller input to a predefined target input, and renders in a virtual space a virtual hand that corresponds to the controller device, wherein when the degree of similarity exceeds a predefined threshold, then the virtual hand is rendered so that a pose of the virtual hand conforms to a predefined hand pose, and wherein when the degree of similarity does not exceed the predefined threshold, then the virtual hand is rendered so that the pose of the virtual hand dynamically changes in response to changes in the controller input.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIGS. 6A, 6B, and 6C illustrate a user interacting with a virtual space through the operation of controllers that detect the poses of the user's hands, and views of a virtual hand based on such operation, in accordance with implementations of the disclosure.

FIGS. 7A, 7B, and 7C illustrate a user interacting with a virtual space through the operation of controllers that detect the poses of the user's hands, and views of a virtual hand based on such operation, in accordance with implementations of the disclosure.

FIGS. 13A-1 and 13A-2 illustrate a head-mounted display (HMD), in accordance with an implementation of the disclosure.

DETAILED DESCRIPTION

Figure 1:
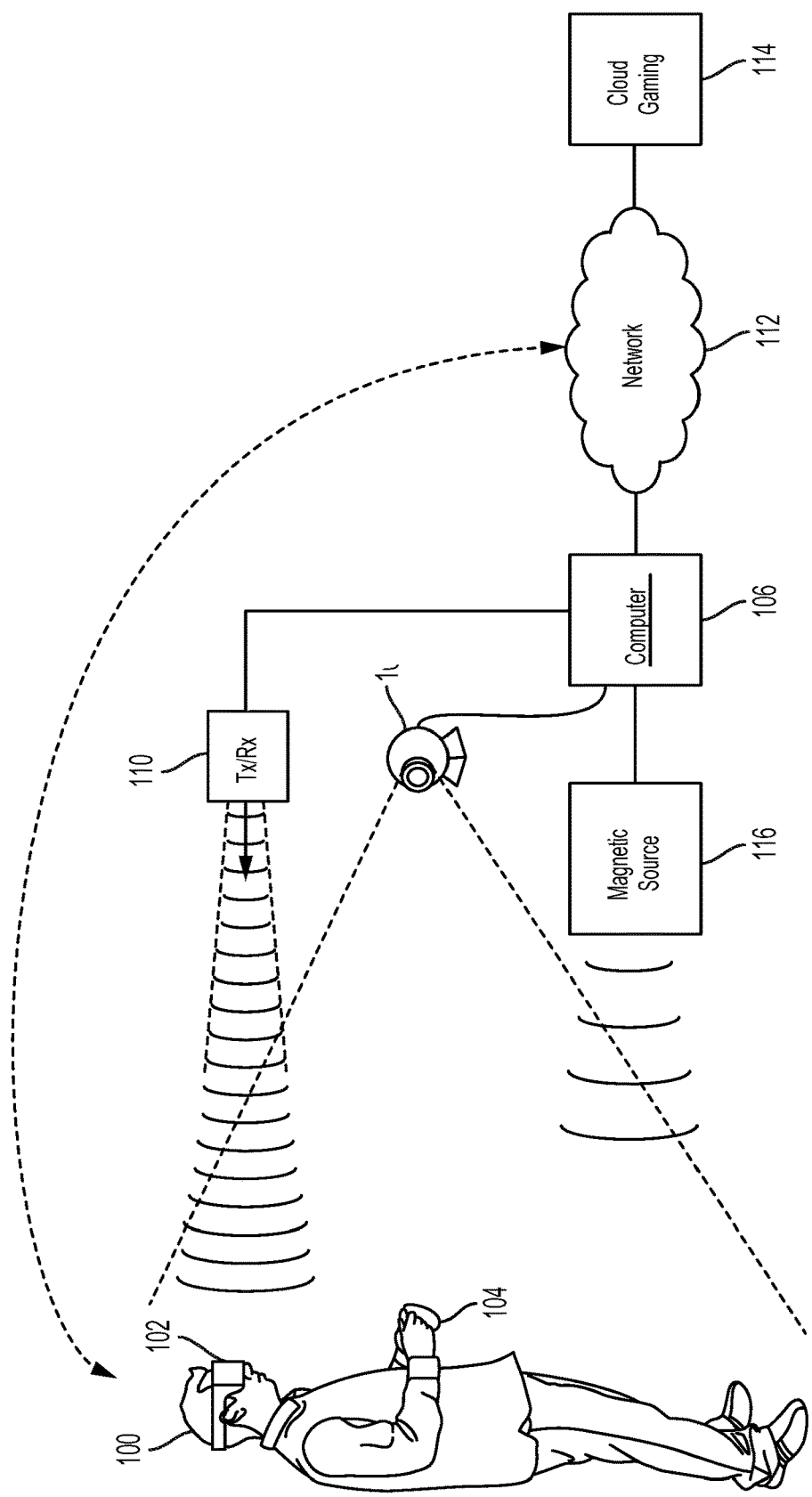
FIG. 1 illustrates a system for interaction with a virtual environment via a head-mounted display (HMD), in accordance with an implementation of the disclosure.
Figure 2A:
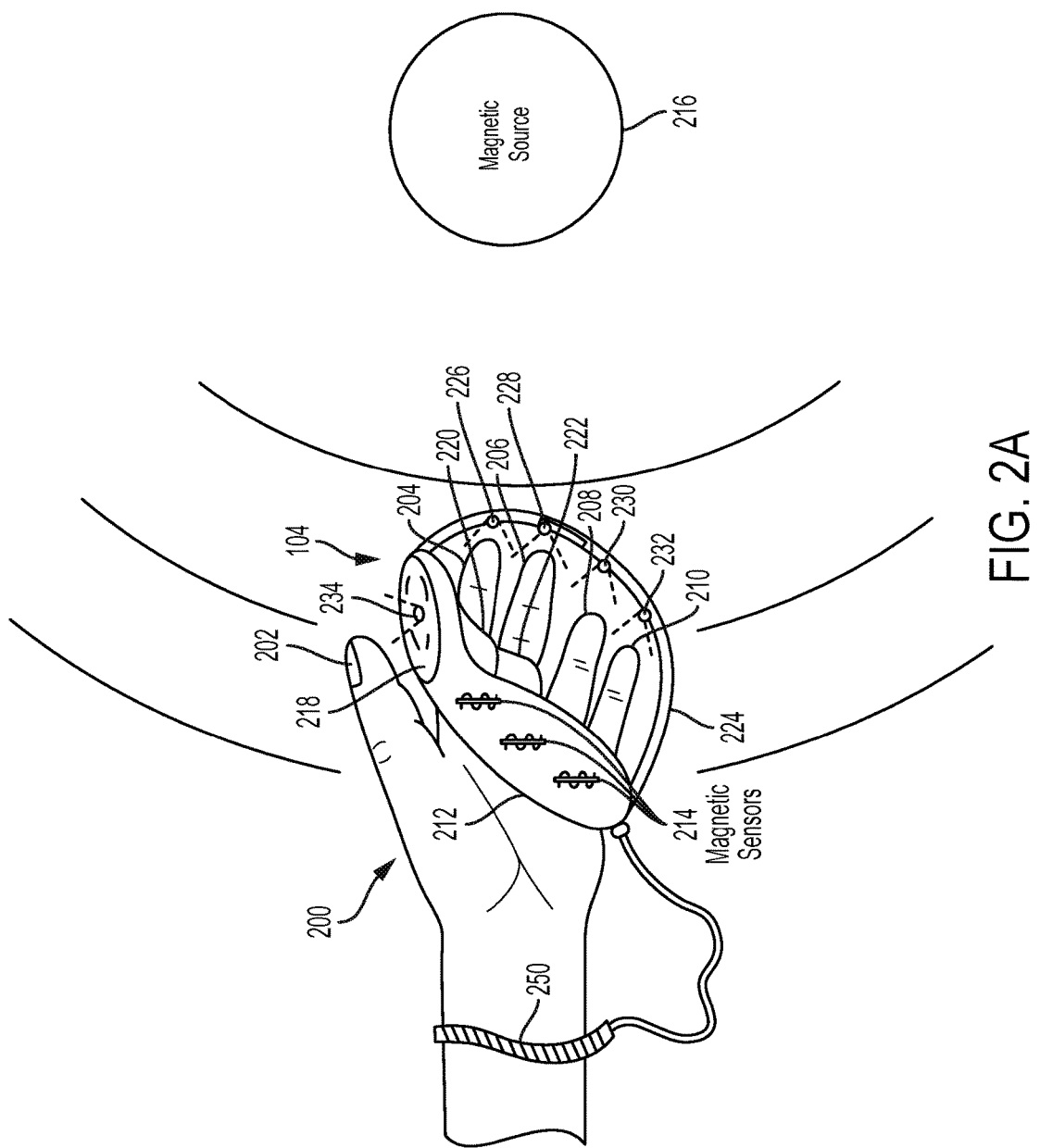
FIGS. 2A, 2B, 2C, and 2D illustrate a controller device 104 for interacting with a virtual space, in accordance with implementations of the disclosure.
Figure 2B:
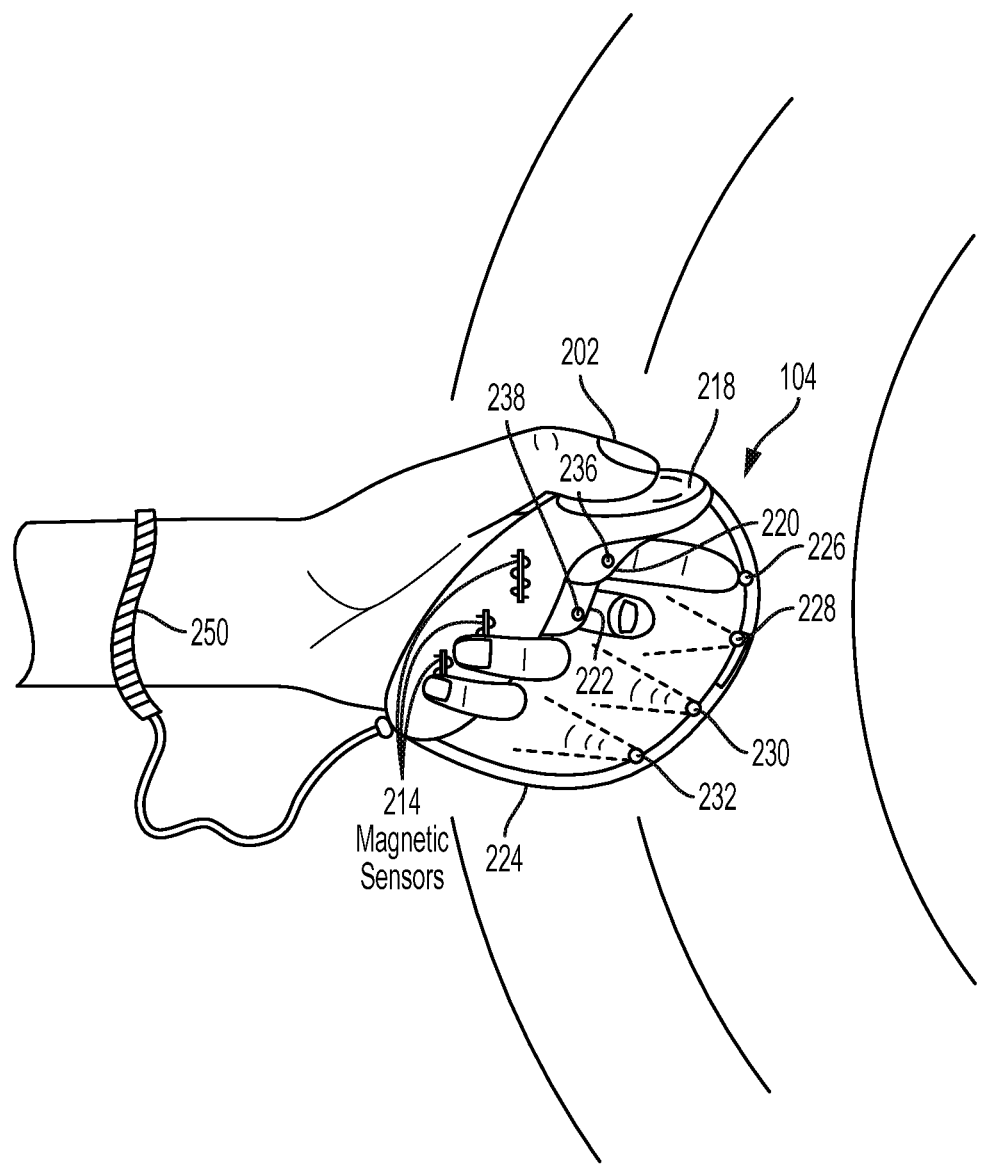
Figure 2C:
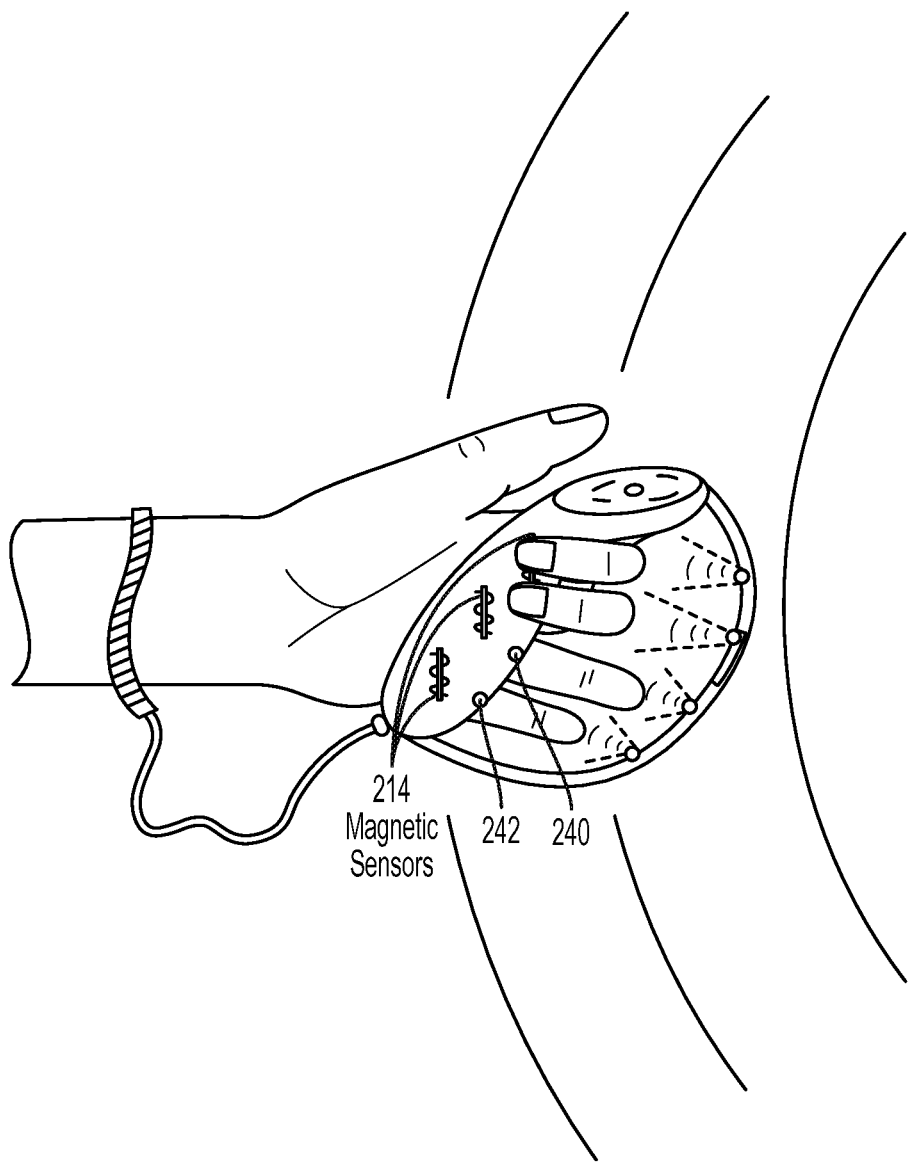
Figure 2D:
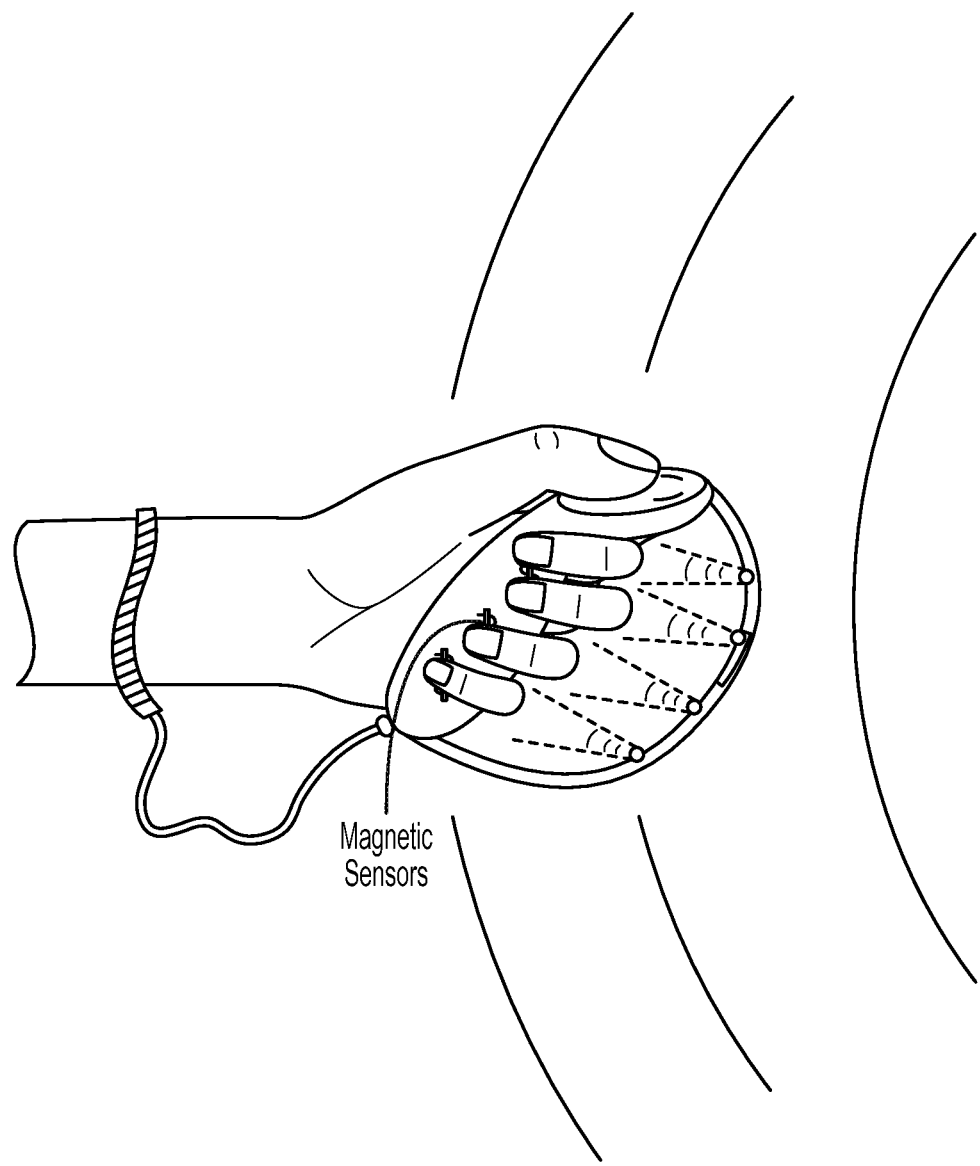

The following implementations of the present disclosure provide devices, methods, and systems relating to rendering of a virtual hand pose based on detected hand input. It will be obvious, however, to one skilled in the art that the present disclosure may be practiced without some or all of the specific details presently described. In other instances, well known process operations have not been described in detail in order not to unnecessarily obscure the present disclosure.

As used herein, the terminology of a "pose" of a hand, whether a virtual hand or an actual real hand of a user, refers to the configuration of the hand itself, that is independent of the overall location (e.g. spatial coordinate location) or overall orientation (e.g. amount of roll, pitch, or yaw) of the hand in space (virtual or real). A hand is defined to include a palm and fingers, including a thumb, index finger, middle finger, ring finger, and pinky/little finger (which can also be numbered as fingers one through five, respectively). The pose of a hand is defined by the postures of the fingers (the posture of a given finger also being independent of the overall location or overall orientation of the finger in space). The postures of the fingers can be defined by amounts of flexion, extension, abduction, adduction, and/or circumduction.

By way of example without limitation, a first is a type of hand pose, wherein the fingers generally exhibit a high degree of flexion and adduction. It will be appreciated that the hand pose of a first is defined by the postures of the fingers, and is furthermore independent of the location and orientation of the hand overall in the spatial environment.

Broadly speaking, implementations of the present disclosure provide systems and methods whereby a virtual hand, whose movements are controlled via input from a user's actual hand, can be rendered to have a certain predefined virtual hand pose when the input from the user's actual hand reaches a threshold level of conformance to a target input set. For example, the user may operate a controller device (e.g. handheld controller, glove interface device, etc.) that includes sensors that detect postures of the fingers of the user's hand. The sensed input values from such sensors are indicative of the postures of the fingers of the user's hand.

However, the sensing capability of the controller device may be limited in its ability to detect the postures of the user's fingers. For example, the sensors may only detect specific kinds of movements of the fingers, such as flexion or extension, and might only detect such movements within a limited range that does not capture the full range of such motion of the user's fingers. Furthermore, the form factor of the controller device itself, and the positioning of the sensors thereon, may in fact limit the ways in which the user's hand can be maneuvered while simultaneously providing detectable input through the controller device. For example, the sensors may be particularly positioned so that the user is required to place their fingers in certain locations in order for movements to be detected by the sensors.

Given these inherent limitations of controller devices, it becomes apparent that the range of potential hand poses can easily exceed the capabilities of a controller device, even one that is highly specialized to detect hand movements. Furthermore, even if a controller device is capable of detecting a desired hand pose of a user's hand, when the user is wearing an HMD, they are unable to see their own hand, and therefore may not produce a desired hand pose for a given context in the virtual environment. An important part of providing a high quality user experience in virtual reality is the rendering of virtual hands which correspond to the user's actual hands, such that the user feels as if the rendered virtual hands are their own hands. This is in part accomplished by allowing the virtual fingers of the virtual hands to be responsive to input produced by movements of the user's actual hands. However, in doing so, as noted above, certain desired hand poses may not be formed by the user (and may indeed not even be capable of being formed while also being accurately detected due to controller hardware limitations).

Thus, in accordance with implementations of the disclosure, methods and systems of the present disclosure provide for predefined virtual hand poses to be rendered based on sensed input that is indicative of the user's hand pose, as well as based on other contextual factors, such as the environmental context, specific tasks to be performed, location and orientation of the user's hand and changes thereto (movements), etc. Broadly speaking, the predefined virtual hand poses are rendered when input is received that approximates a target input set or otherwise indicates the user's desire to form a given predefined hand pose, whereas when the input does not approximate the target input set or otherwise indicate the user's desire to form the given predefined hand pose, then the virtual fingers are dynamically controlled by the input so that changes in the input are rendered in real-time as changes to postures of the virtual fingers.

In various implementations, the methods, systems, image capture objects, sensors and associated interface objects (e.g., gloves, controllers, peripheral devices, etc.) are configured to process data that is configured to be rendered in substantial real-time on a display screen. Broadly speaking, implementations are described with reference to the display being of a head mounted display (HMD). However, in other implementations, the display may be of a second screen, a display of a portable device, a computer display, a display panel, a display of one or more remotely connected users (e.g., whom may be viewing content or sharing in an interactive experience), or the like.

FIG. 1 illustrates a system for interaction with a virtual environment via a head-mounted display (HMD), in accordance with implementations of the disclosure. An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to movements of the HMD (as controlled by the user) to provide the sensation to the user of being in the virtual space. For example, the user may see a three-dimensional (3D) view of the virtual space when facing in a given direction, and when the user turns to a side and thereby turns the HMD likewise, then the view to that side in the virtual space is rendered on the HMD. In the illustrated implementation, a user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user, and may also provide viewing with three-dimensional depth and perspective.

In the illustrated implementation, the HMD 102 is wirelessly connected to a computer 106. In other implementations, the HMD 102 is connected to the computer 106 through a wired connection. The computer 106 can be any general or special purpose computer known in the art, including but not limited to, a gaming console, personal computer, laptop, tablet computer, mobile device, cellular phone, tablet, thin client, set-top box, media streaming device, etc. In some implementations, the computer 106 can be configured to execute a video game, and output the video and audio from the video game for rendering by the HMD 102. In some implementations, the computer 106 is configured to execute any other type of interactive application that provides a virtual space/environment that can be viewed through an HMD. A transceiver 110 is configured to transmit (by wired connection or wireless connection) the video and audio from the video game to the HMD 102 for rendering thereon. The transceiver 110 includes a transmitter for transmission of data to the HMD 102, as well as a receiver for receiving data that is transmitted by the HMD 102.

In some implementations, the HMD 102 may also communicate with the computer through alternative mechanisms or channels, such as via a network 112 to which both the HMD 102 and the computer 106 are connected.

The user 100 may operate an interface object 104 to provide input for the video game. Additionally, a camera 108 can be configured to capture images of the interactive environment in which the user 100 is located. These captured images can be analyzed to determine the location and movements of the user 100, the HMD 102, and the interface object 104. In various implementations, the interface object 104 includes a light which can be tracked, and/or inertial sensor(s), to enable determination of the interface object's location and orientation and tracking of movements.

In some implementations, a magnetic source 116 is provided that emits a magnetic field to enable magnetic tracking of the HMD 102 and interface object 104. Magnetic sensors in the HMD 102 and the interface object 104 can be configured to detect the magnetic field (e.g. strength, orientation), and this information can be used to determine and track the location and/or orientation of the HMD 102 and the interface object 104.

In some implementations, the interface object 104 is tracked relative to the HMD 102. For example, the HMD 102 may include an externally facing camera that captures images including the interface object 104. The captured images can be analyzed to determine the location/orientation of the interface object 104 relative to the HMD 102, and using a known location/orientation of the HMD, so determine the location/orientation of the interface object 104 in the local environment.

The way the user interfaces with the virtual reality scene displayed in the HMD 102 can vary, and other interface devices in addition to interface object 104, can be used. For instance, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the HMD 102.

Additionally, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In some implementations, the computer 106 functions as a thin client in communication over a network 112 with a cloud gaming provider 114. In such an implementation, generally speaking, the cloud gaming provider 114 maintains and executes the video game being played by the user 102. The computer 106 transmits inputs from the HMD 102, the interface object 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a haptic/vibration feedback command is provided to the interface object 104.

In some implementations, the HMD 102, interface object 104, and camera 108, may themselves be networked devices that connect to the network 112, for example to communicate with the cloud gaming provider 114. In some implementations, the computer 106 may be a local network device, such as a router, that does not otherwise perform video game processing, but which facilitates passage of network traffic. The connections to the network by the HMD 102, interface object 104, and camera 108 may be wired or wireless.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations.

FIGS. 2A, 2B, 2C, and 2D illustrate a controller device 104 for interacting with a virtual space, in accordance with implementations of the disclosure. Broadly speaking, the controller device 104 is configured to be handheld and/or secured to the user's hand 200. In some implementations, a strap (or band, or other mechanism for attachment) for securing the controller device 104 to the user's hand 200 is provided (not shown). In some implementations, such a strap is configured to wrap around the palm portion of the user's hand 200, thereby securing the controller device 104 against the user's palm. In some implementations, such a palm strap is configured to substantially encircle the user's palm when in use, with a portion/length of the strap being fixed/mounted to the side of the controller device 104, thereby securing the controller device to the user's hand. In some implementations, the strap mechanism includes a locking mechanism that enables the strap to be toggled between a locked configuration that secures the controller against the user's palm, and a released configuration that loosens the strap and/or moves a portion of it away from the controller body. The locking mechanism can thus make the controller device firmly snap to the user's hand, or partially release from the user's hand.

In some implementations, the controller device 104 includes a wrist strap 250 to secure the controller device 104 to the user's wrist.

The controller device 104 is configured to be trackable in the three-dimensional real space of the local environment in which the controller device 104 is disposed. To this end, the controller device 104 may include any of various motion/orientation/inertial sensors, including by way of example without limitation, one or more accelerometers, magnetometers, and gyroscopes. Furthermore, the controller device 104 may include one or more magnetic sensors 214 that are configured to detect the strength and/or orientation of a magnetic field that is emitted by a magnetic source 216. In some implementations, the magnetic source 216 is disposed in the form factor of a peripheral device, which may be connected to, and/or controlled by, the computing device 106. In some implementations, the magnetic source 216 can be disposed in an existing peripheral device, such as the image capture device 108. In some implementations, the magnetic source 216 can be disposed in the computing device 106. Data or information from the motion/orientation/inertial sensors and the magnetic sensors can be processed to determine and track the location and orientation of the controller device 104. Such data processing can be performed by the controller device 104 and/or the computing device 106.

In the illustrated implementation, the controller device 104 includes a main housing 212 that is configured to be held or gripped by the user's hand 200. The controller device 104 further includes a thumb pad 218 that is positioned where the thumb 202 of the user's hand 200 would naturally fall when holding the controller device 104. In some implementations, the thumb pad is a touch-sensitive surface or touchpad capable of providing touch-based input. In some implementations, the thumb pad is a directional pad that facilitates directional input. In some implementations, the thumb pad is clickable or capable of being depressed similar to a button.

The thumb pad 218 further includes a proximity sensor 234 which is configured to detect the proximity of the thumb 202 to the thumb pad 218. In so doing, the proximity sensor 234 may indicate an amount of flexion or extension of the user's thumb 202.

A trigger 220 is configured to be operated by the index finger 204 of the user's hand 200, whereas the trigger 222 is configured to be operated by the middle finger 204 of the user's hand 200, when operating the controller device 104. The triggers 220 and 222 further include proximity sensors 236 and 238 (shown at FIG. 2B), respectively, which are configured to detect the proximity of the user's index finger 204 and middle finger 206 to the triggers 220 and 222, respectively. The proximity sensors 236 and 238 thus indicate an amount of flexion or extension of the index and middle fingers, respectively. That is, when the user's index finger 204 increases in flexion (decreases in extension), its proximity to the proximity sensor 236 increases; and when the user's index finger 204 decreases in flexion (increases in extension), its proximity to the proximity sensor 236 decreases. Similarly, when the user's middle finger 206 increases in flexion (decreases in extension), its proximity to the proximity sensor 238 increases; and when the user's middle finger 206 decreases in flexion (increases in extension), its proximity to the proximity sensor 238 decreases.

Additionally, the controller device 104 includes proximity sensors 240 and 242 (shown at FIG. 2C), which are positioned at locations along the lower portion of the housing 212 so as to detect the proximity of the user's ring finger 208 and pinky finger 210, respectively. The proximity sensors 240 and 242 thus indicate amounts of flexion or extension of the ring and pinky fingers, respectively. That is, when the user's ring finger 208 increases in flexion (decreases in extension), its proximity to the proximity sensor 240 increases; and when the user's ring finger 208 decreases in flexion (increases in extension), its proximity to the proximity sensor 240 decreases. Similarly, when the user's pinky finger 210 increases in flexion (decreases in extension), its proximity to the proximity sensor 242 increases; and when the user's pinky finger 210 decreases in flexion (increases in extension), its proximity to the proximity sensor 242 decreases.

The controller device 104 further includes a band 224, having proximity sensors 226, 228, 230, and 232. These proximity sensors are positioned by the structure of the band 224 to be proximate to the fingertips of the index, middle, ring, and pinky fingers, respectively, when these fingers are extended. In other words, when the user's index finger 204 increases in extension (decreases in flexion), its proximity to the proximity sensor 226 increases; and when the user's index finger 204 decreases in extension (increases in flexion), its proximity to the proximity sensor 226 decreases. When the user's middle finger 206 increases in extension (decreases in flexion), its proximity to the proximity sensor 228 increases; and when the user's middle finger 206 decreases in extension (increases in flexion), its proximity to the proximity sensor 228 decreases. When the user's ring finger 208 increases in extension (decreases in flexion), its proximity to the proximity sensor 230 increases; and when the user's ring finger 208 decreases in extension (increases in flexion), its proximity to the proximity sensor 230 decreases. When the user's pinky finger 210 increases in extension (decreases in flexion), its proximity to the proximity sensor 232 increases; and when the user's pinky finger 210 decreases in extension (increases in flexion), its proximity to the proximity sensor 232 decreases.

Figure 3A:
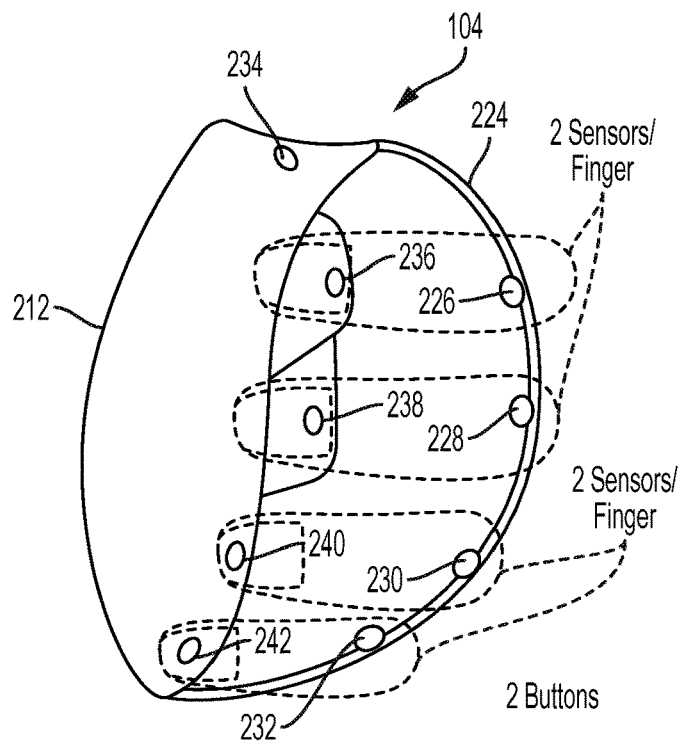
FIGS. 3A and 3B illustrate a controller device configured so that two proximity sensors per finger are used to detect the flexion/extension of the user's index, middle, ring, and pinky fingers, in accordance with implementations of the disclosure.
Figure 3B:
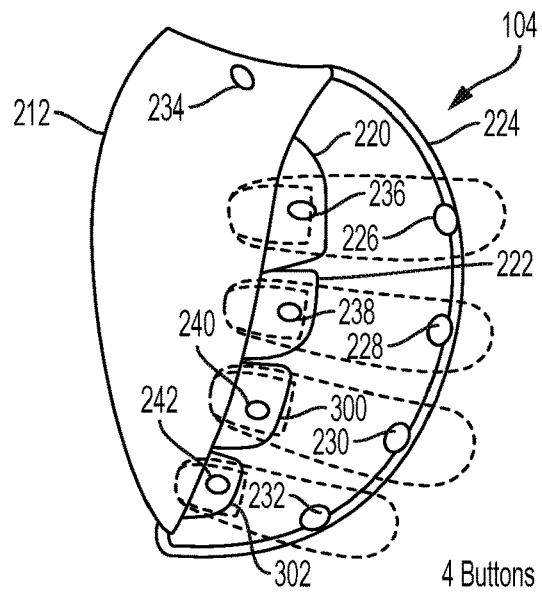

In view of the foregoing, and with reference to FIGS. 3A and 3B, the controller device 104 is configured so that two proximity sensors per finger are used to detect the flexion/extension of the user's index, middle, ring, and pinky fingers. Thus, each finger has a corresponding proximity sensor pair, with the sensors being aligned substantially along the plane of flexion/extension for a given finger to which the sensors are assigned, but at opposite ends of the finger's range of motion. For example, the sensors 226 and 236, which are configured to detect the user's index finger 204, are aligned substantially along the plane of flexion/extension of the user's index finger 204. Furthermore, the sensor 226 is positioned so as to be near to (or possibly touching) the distal end of the index finger 204 when extended, whereas the sensor 236 is positioned so as to be closer to the proximal end of the index finger 204 when extended. It will be appreciated that a similar arrangement and positioning of the sensor pairs for the other fingers also applies.

Accordingly, in some implementations, the sensors 226, 228, 230, and 232 are considered to be distal sensors, whereas the sensors 236, 238, 240, and 242 are considered to be proximal sensors, based on their respective positioning relative to the distal and proximal ends of the user's fingers when extended. The pair of proximal and distal sensors for a given finger are utilized together to determine the postures of the given finger. It will be appreciated that the proximity sensing ranges of the distal and proximal sensors for a given finger may overlap with each other. Thus, in some implementations, as the posture of the finger changes from a maximally flexed posture to a maximally extended posture (e.g. as permitted by the structure/form of the controller device 104), the finger may be initially detectable by the proximal sensor only (as it is not within the detection range of the distal sensor), and then detectable by both the proximal and the distal sensors as it enters the detection range of the distal sensor while still being within the detection range of the proximal sensor, and finally detectable by only the distal sensor as the finger leaves the detection range of the proximal sensor.

FIG. 3B illustrates a controller device 104 having four buttons/triggers, in accordance with implementations of the disclosure. The controller device 104 is similar to the above-described implementations, but further includes triggers/buttons 300 and 302, which are configured to be depressed by the user's ring and pinky fingers, respectively. In the illustrated implementation, the proximity sensors 240 and 242 are included in the triggers/buttons 300 and 302, respectively. Each of the triggers/buttons 220, 222, 300, and 302 can be configured to provide haptic feedback, such as force feedback, vibration feedback, etc. Furthermore, the main body 212 of the controller device 104 can be configured to provide vibration feedback in some implementations.

Though not specifically shown, in some implementations, the controller device 104 can include one or more lights or illuminated objects, which can be recognized in captured images of the local environment and tracked to enable location and orientation tracking of the controller device 104. By way of example without limitation, one or more lights can be positioned along the band 224 and/or along the housing 212 of the controller device 104.

Figure 4A:
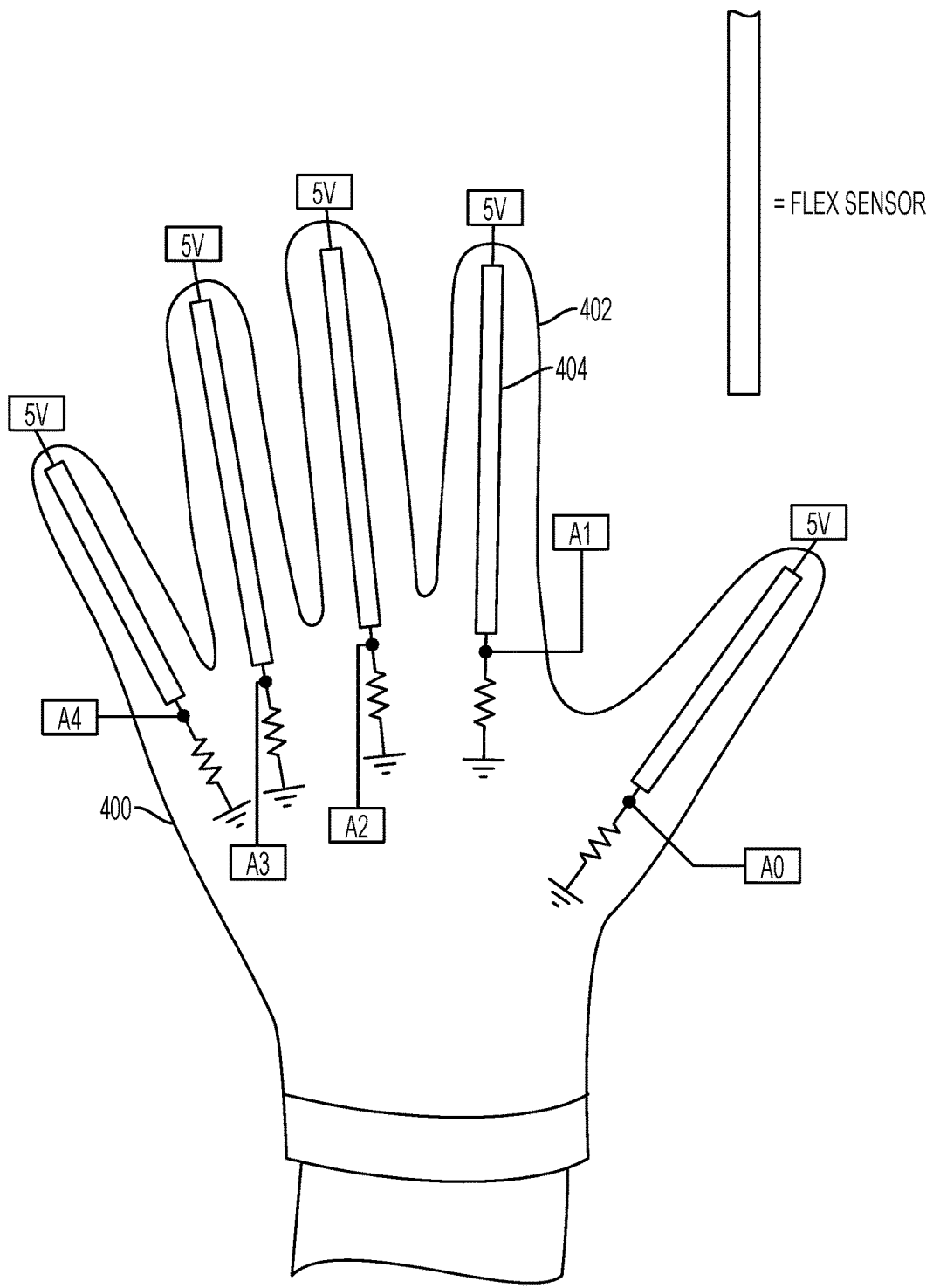
FIG. 4A illustrates a controller device in the form factor of a glove interface object incorporating a plurality of flex sensors, in accordance with an implementation of the disclosure.

FIG. 4A illustrates a controller device 104 in the form factor of a glove interface object 400 incorporating a plurality of flex sensors, in accordance with an implementation of the disclosure. FIG. 4A additionally schematically illustrates circuitry of the flex sensors, in accordance with implementations of the disclosure. As shown, the glove interface object 400 includes a flex sensor that is defined along the top surface of each of the fingers of the glove interface object 400. For example, the index finger 402 includes a flex sensor 404 that extends from the base of the index finger 402, that is where the knuckle of the index finger would be present, to the tip of the index finger 402. In the illustrated implementation, the flex sensors are positioned along the top surface of each of the fingers of the glove interface object, which correlates to the top side of the user's fingers, i.e. the back of the user's hand (opposite the palm side of the user's hand). However, it will be appreciated that in other implementations the flex sensors can be positioned at other locations around the finger portions of the glove interface object, such as along the sides of the fingers or along the bottom of the fingers (i.e. the palm facing side of the fingers).

Each flex sensor is configured to detect flexion of a portion of the user's hand such as the user's fingers. In some implementations, a flex sensor is defined to include a flex sensitive resistor, whose resistance changes based on the amount of flexion of the resistor. Examples of flex sensors are known in the art, and include those manufactured and/or sold by Spectra Symbol, etc. In some implementations, as the flexion of the flex sensitive resistor increases, the resistance of the resistor increases. With continued reference to FIG. 4A, each flex sensor is connected to a single analog input (A0-A5), yielding a total of five analog inputs. It will be appreciated that any type of flex sensor that is capable of detecting and/or quantifying flexion may be utilized for purposes of detecting flexion of a glove interface object.

Figure 4B:
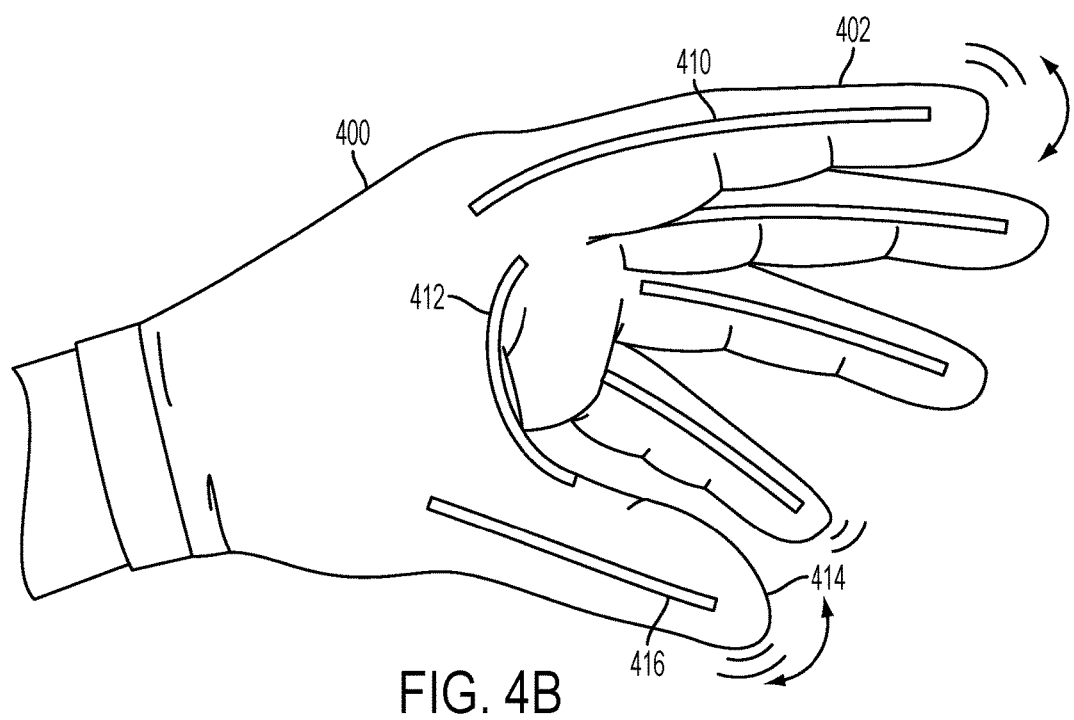
FIG. 4B illustrates a side view of a glove interface object having flex sensors defined thereon, in accordance with an implementation of the disclosure.

FIG. 4B illustrates a side view of a glove interface object having flex sensors defined thereon, in accordance with an implementation of the disclosure. In the illustrated implementation, the index finger 402 of the glove interface object 400 has a flex sensor 410 defined along a side surface of the index finger 402. It may be advantageous to position flex sensors along side surfaces of the fingers of the glove interface object because the distance along the side of a given finger will not change as significantly as that of the top or bottom surface of the finger when it is flexed. Generally speaking, as the fingers are flexed (i.e. closed), the length along the top surface of the fingers increases, and the length along the bottom surface of the fingers decreases. Thus, when flex sensors are positioned along the top surface of the fingers, if they are substantially non-elastic, then the flex sensors may tend to pull back on the fingers, resisting their flexing.

FIG. 4B additionally illustrates a flex sensor 416 positioned along the thumb portion of the glove interface object 400. Also, a flex sensor 412 is positioned along the portion of the glove interface object that is between the index finger and thumb, so as to detect the abduction/adduction between the index finger and thumb.

Figure 4C:
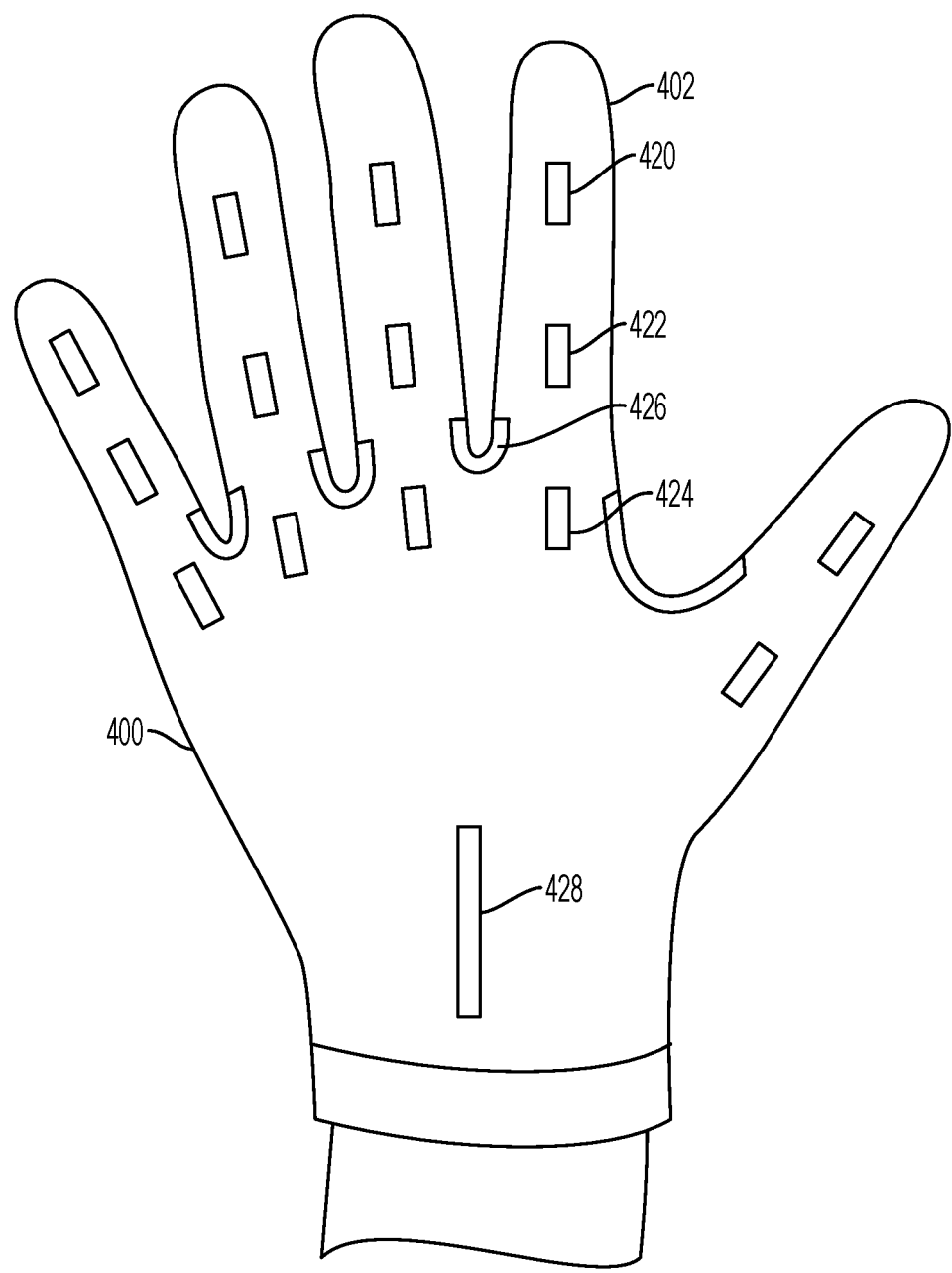
FIG. 4C illustrates a glove interface object having a plurality of flex sensors positioned at joint regions of the glove interface object, in accordance with an implementation of the disclosure.

FIG. 4C illustrates a glove interface object having a plurality of flex sensors positioned at joint regions of the glove interface object, in accordance with an implementation of the disclosure. In the illustrated implementation, for example, the index finger portion 402 of the glove interface object includes: a flex sensor 420 positioned to detect flexion of the distal interphalangeal joint of the user's index finger, a flex sensor 422 positioned to detect flexion of the proximal interphalangeal joint of the user's index finger, and a flex sensor 424 positioned to detect flexion of the knuckle (metacarpal phalangeal joint) of the user's index finger. The other finger portions of the glove interface object 400 include similarly positioned flex sensors to detect flexion of the various joints of the fingers of the user's hand.

Additionally, flex sensors are located between the finger portions of the glove interface object 400, such as flex sensor 426, which is positioned to detect flexion or spreading between the index finger and middle finger. In the illustrated implementation, other flex sensors are similarly positioned between adjacent fingers to detect the spread between the adjacent fingers.

Furthermore, a flex sensor 428 is positioned along a top wrist portion of the glove interface object 400, so as to detect flexion of the user's wrist. In some implementations, a flex sensor is positioned along a bottom wrist portion of the glove interface object. In some implementations, additional flex sensors may be positioned along the sides of the wrist to detect sideways flexion of the wrist.

In some implementations, a calibration procedure is provided for calibrating the flex sensors of the glove interface object. For example, the calibration procedure may entail having the user operate the glove interface object so that the flex sensors are positioned in their least flexed positions, and/or their most flexed positions. Flex sensor data may be read at these positions to define upper/lower bounds and/or ranges of the flex sensor data for each flex sensor.

Figure 5B:
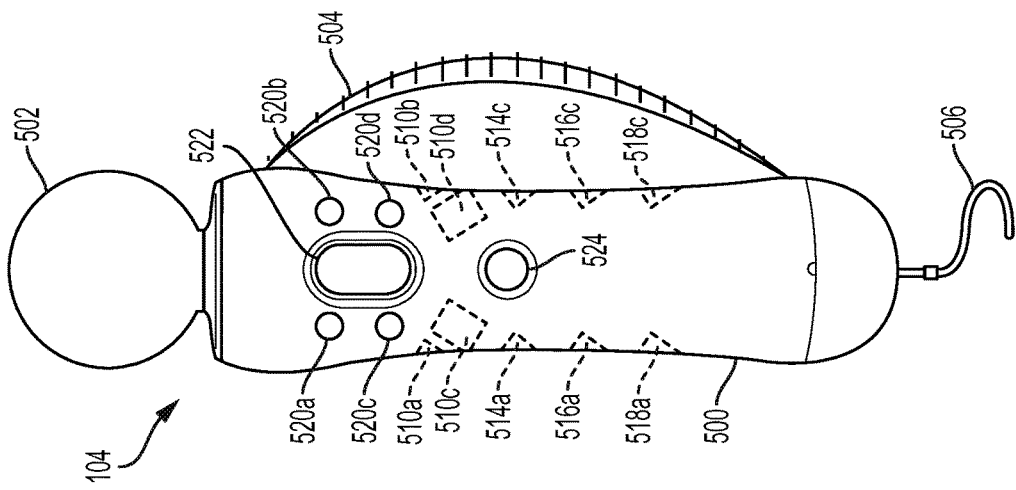
FIGS. 5A and 5B illustrate bottom and top views of a controller device, in accordance with implementations of the disclosure.
Figure 5A:
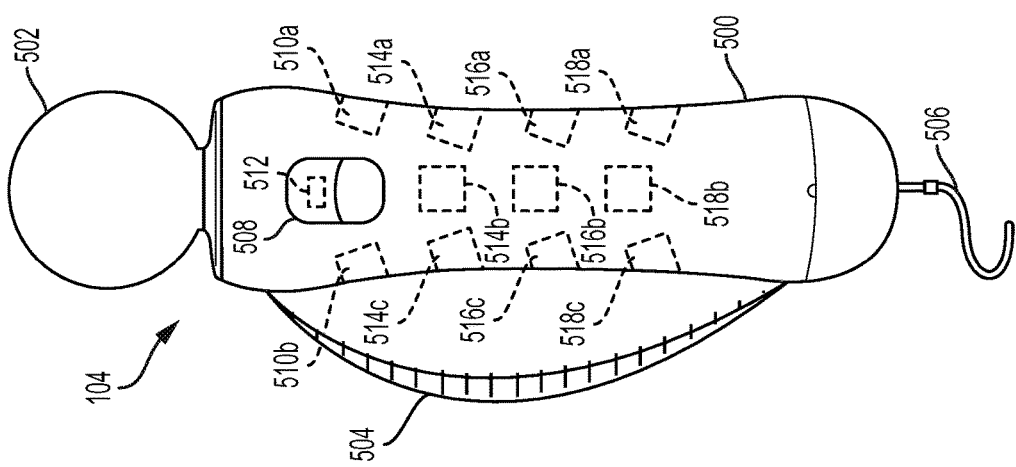

FIG. 5A illustrates a bottom view of a controller device, in accordance with implementations of the disclosure. In the illustrated implementation, the controller device 104 is in the form of a handheld motion controller. As shown, the controller device 104 includes a housing 500 that is configured to be gripped/held by a user's hand. The controller device 104 further includes an illuminated object 502 that is illuminated during use, to facilitate image-based tracking of the controller device 104. That is, captured images of the local interactive environment, for example captured by the camera 108, are analyzed to determine and track the location of the illuminated object, and thereby facilitate tracking of the controller device 104.

To secure controller device 104 to the user's hand and prevent accidental dropping of the controller device 104, the controller device 104 further includes a hand strap 504 that is configured to wrap around the palm of the user's hand, thereby maintaining the controller device 104 in contact with the user's palm even when the user's hand is completely open (fingers extended). The controller device 104 also includes a wrist strap 506 configured to secure the controller device 104 to the user's wrist. The controller device 104 further includes a trigger 508, that is configured to be operated by the index finger of the user's hand, when holding the controller device 104.

In order to detect the postures of the fingers of the user's hand, the controller device 104 includes a plurality of proximity sensors that are configured to detect the presence or absence of portions of the user's fingers in proximity to the proximity sensors, and/or distances to the portions of the user's fingers, when the user is holding/operating/using the controller device 104. These include proximity sensors 510a, 510b, 512, 514a-c, 516a-c, and 518 a-c.

The various proximity sensors may detect the presence/absence/distance of different portions of the user's fingers depending upon which hand is holding the controller device 104 and the size of the user's hand. Broadly speaking for an average size hand, when the controller device 104 as shown is held by the user's right hand, then the proximity sensor 510a is configured to detect the proximity of the right thumb, whereas the proximity sensors 510b and 512 are configured to detect the proximity of portions of the right index finger. It will be appreciated that the proximity sensor 512 is integrated with the trigger 508, thereby providing both trigger functionality and proximity sensing simultaneously. Continuing with reference to the controller device 104 being held by the right hand of the user, then the proximity sensors 514a, 514b, and 514c are configured to detect the proximity of various portions of the user's right middle finger; the proximity sensors 516a, 516b, and 516c are configured to detect the proximity of various portions of the user's right ring finger; and the proximity sensors 518a, 518b, and 518c are configured to detect the proximity of various portions of the user's right pinky finger.

It will be appreciated that the postures of the fingers of the user's hand can be determined or inferred based on the sensed input from the proximity sensors. For example, the sensed input from the proximity sensors can be processed to determine the amount of flexion or extension of the various fingers of the user's hand.

Furthermore, it will be appreciated that while the foregoing has been described with reference to the controller device 104 being held by the right hand of the user, the controller device 104 may also be operated by the left hand of the user, in which case the sensed input from the various proximity sensors will indicate postures of the fingers of the user's left hand. For example, in the illustrated implementation, the posture of the user's left thumb will be sensed by the proximity sensor 510*b*, whereas the posture of the user's left index finger will be sensed by the proximity sensors 510*a* and 512. The posture of the user's left middle finger will be sensed by the proximity sensors 514*a*, 514*b*, and 514*c*; the posture of the user's left ring finger will be sensed by the proximity sensors 516*a*, 516*b*, and 516*c*; and the posture of the user's left pinky finger will be sensed by the proximity sensors 518*a*, 518*b*, and 518*c*.

FIG. 5B illustrates a top view of the controller device 104, in accordance with implementations of the disclosure. As shown, the controller device 104 includes various buttons 520*a*, 520*b*, 520*c*, 520*d*, 522, and 524. It should be appreciated that in other implementations, the controller device 104 may include any of various other types of input devices, such as a joystick, touchpad, directional pad, etc.

As shown in the illustrated implementation, there are additional proximity sensors 510*c* and 510*d*. When the user is holding/operating the controller device 104 with their right hand, the proximity sensor 510*c* may detect the presence of the user's right thumb, and may therefore indicate flexion or extension of the user's right thumb. Similarly, the proximity sensor 510*d* may indicate the presence of the user's right index finger. The opposite scenario will apply when the controller device 104 is being operated by the user's left hand.

Figure 5C:
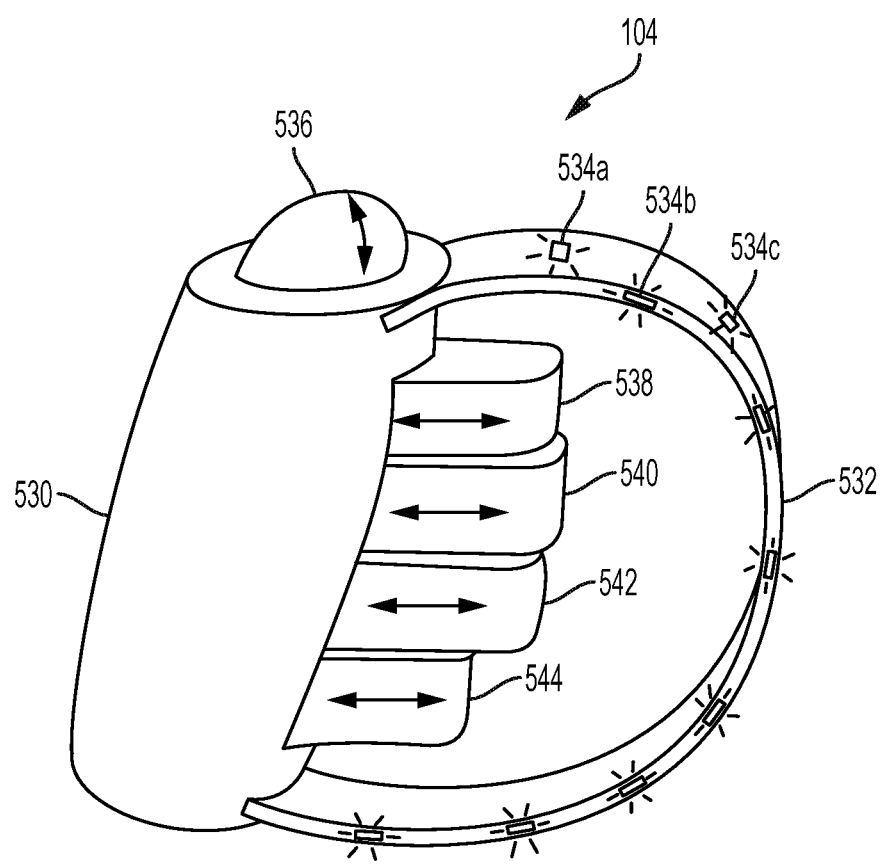
FIG. 5C illustrates an example of a controller device, in accordance with implementations of the disclosure.

FIG. 5C illustrates an example of a controller device 104, in accordance with implementations of the disclosure. In the illustrated implementation, the controller device 104 includes a main body 530 that is held by the user's hand, and a band 532 that includes various emitters, such as emitters 534*a*, 534*b*, and 534*c*. In some implementations, the emitters can be lights that emit visible light, whereas in other implementations, the emitters may emit non-visible wavelengths such as infrared radiation. The emitters are configured to be recognized in captured images of the local environment that include the controller device 104. Further, the configuration of the emitters in the captured images, including their location and orientation, can be processed to determine and track the controller device 104 location and/or orientation in the local interactive environment.

Though not specifically shown, the controller device 104 may also include one or more straps or other mechanisms for securing the controller device 104 to the hand and/or wrist of the user.

In the illustrated implementation, the controller device 104 includes a number of triggers that are configured to detect the postures of the user's hand. The triggers include a trigger 536 for detecting a posture of the user's thumb, a triggers 538 for detecting the posture of the user's index finger, a trigger 540 for detecting the posture of the user's middle finger, a trigger 542 for detecting the posture of the user's ring finger, and a trigger 544 for detecting the posture of the user's pinky/little finger.

Broadly speaking, depressing a given trigger indicates flexion of the corresponding finger, whereas release of the given trigger indicates extension of the corresponding finger.

For example, depressing the trigger 536 indicates flexion of the thumb, whereas release of the trigger 536 indicates extension of the thumb. Depressing the trigger 538 indicates flexion of the user's index finger, and release of the trigger 538 indicates extension of the user's index finger. Similar operation applies to the triggers 540, 542 and 544 in relation to the middle, ring and pinky fingers, respectively.

It should be appreciated that the triggers are configured to sense a range of amounts by which the triggers are depressed or released. That is, the triggers are capable to detect more than just binary states of being depressed or released, but also amounts by which they are depressed or released. The sensed input from a given trigger can indicate the position of the trigger within its potential range of travel, thereby indicating the amount by which the given trigger is being depressed, or the amount by which the given trigger is being released. The sensed input can therefore indicate the amounts of flexion or extension of the finger that is sensed by the given trigger.

Additionally, in some implementations, the triggers can be configured to provide haptic feedback to the user. For example, the triggers may be configured to provide resistance, vibration, or other haptic sensations, in response to interactions in a virtual space such as touching a virtual object with a virtual hand that is controlled by the controller device 104.

The controller device 104 may include any of various motion sensors and/or inertial sensors, such as one or more accelerometers, magnetometers, or gyroscopes.

Furthermore, the controller device 104 may include one or more magnetic sensors that are configured to detect a magnetic field emitted by a magnetic emitter located in the local environment in which the controller device 104 is disposed. For example, the magnetic emitter may be included in a peripheral device (such as the image capture device 108), a computing device (such as the computing device 106), or other device in the local environment. The magnetic sensors can sense the magnetic field, and output data that indicates the strength of the magnetic field sensed by the magnetic sensors (indicating distance from the magnetic emitter), and also the orientation of the magnetic sensors relative to the magnetic field. This data can be utilized to determine the location and orientation of the controller device 104 in the local environment.

FIG. 6A illustrates a user interacting with a virtual space through the operation of controllers that detect the poses of the user's hands, in accordance with implementations of the disclosure. As shown, the user 100 views a virtual space through an HMD 102, and operates controller devices 104*a* and 104*b* with the user's left and right hands, respectively. The controller devices 104*a* and 104*b* are capable of detecting, at least in part, the postures of the fingers of the user's hands. The controller devices 104*a* and 104*b* can employ proximity sensors, triggers, flex sensors, or other mechanisms to enable detection of the postures of the fingers of the user's hands.

In the illustrated implementation, a magnified view 600 shows the user's left hand 602 holding the controller device 104*a*. As shown, the user's left hand 602 is closed about the controller device 104*a*, with the fingers exhibiting flexion and contacting the controller device 104*a* in the respective locations of the controller device 104*a* that are configured to detect the individual postures of the fingers, such as where triggers or proximity sensors are located. In some implementations, the controller device 104*a* provides sensor input that indicates amounts of flexion or extension of the user's left hand fingers.

In order to provide a realistic experience to the user 100, the fingers of a virtual hand corresponding to the user's hand (e.g. hand of an avatar in the virtual space that corresponds to the user 100) can be rendered in real-time in the virtual space, in a manner that is dynamically responsive to changes in the sensed input from the controller device 104. That is, by way of example without limitation, the amount of flexion/extension detected through the sensed input from the controller device 104a, which results from flexion/extension of the user's left hand fingers, can control the amount of flexion/extension of a corresponding virtual left hand in the virtual space. Providing such responsive dynamic control of the virtual hand imparts a sense of realism to the user 100, such that the user feels as if the virtual hand is their own hand, with movements of the fingers of the user's actual hand being immediately mapped to and rendered as movements of the corresponding virtual hand in real-time. In some implementations, this defines a first mode of operation of the system.

Providing the above-described real-time responsive rendering of the virtual hand provides a realistic virtual reality experience. However, because of the configuration of the controller device 104a, it may not be possible for the user 100 to form certain desired hand poses, such as a tight fist. Such a hand pose may not be possible because of the presence of the controller device 104a in the user's left hand 602. Thus, in providing for dynamically responsive rendering of the virtual hand in a realistic manner as described above with the controller device 104a, this may also mean that certain hand poses are not attainable through this rendering construct, perhaps due to the limitations of the hardware configuration of the controller device 104a.

Therefore, in some implementations, a second mode of operation is provided wherein when the user's hand pose is determined to sufficiently approximate the desired hand pose of a fist, as determined from the sensed input from the controller device 104a, then the pose of the corresponding virtual hand is configured to form the desired hand pose of a first as a predefined hand pose. In this manner, the rendered pose of the virtual hand "snaps" to the predefined hand pose (in this case, a first) when the user's hand pose approximates the predefined hand pose to a predefined extent. In some implementations, this is defined based on the user's hand pose reaching a threshold level of similarity to the predefined hand pose. In some implementations, this is defined by a sensed input set achieving conformance to a target input set or reaching a threshold level of similarity to the target input set (e.g. the sensed input set falling within a specified range of the target input set).

It is noted that even if a particular set of sensed input is mapped to rendering of a tight fist, the user 100 might still not conform their hand about the controller 104a in the necessary way so as to produce the particular set of sensed input, in all desired situations, which may in part be due to the inability of the user 100 wearing the HMD 102 to see their own hands. Therefore, in some implementations, it is desirable to enable a range of possible poses or input that are sufficiently similar to the desired hand pose or target input set, so that the user is not required to form their hand into a very specific pose in order to achieve rendering of the virtual hand in the desired hand pose.

With continued reference to the illustrated implementation, FIG. 6B illustrates a view of a virtual hand 604 which corresponds to the user's left hand 602, in accordance with implementations of the disclosure. As shown, the virtual hand 604 is rendered according to the first mode of operation described above, wherein the movements of the fingers of the user's left hand 602 are rendered as movements of the fingers of the virtual hand 604 in real-time. In accordance with some implementations, the illustrated virtual hand 604 is shown in a configuration that is defined by sensed input from the controller device 104a, and configured to accurately mimic the actual pose of the user's left hand 602 based on the sensed input, including rendering of the postures of the individual fingers of the user's left hand 602 based on the sensed input. For example, the sensed input may indicate amounts of flexion/extension of the fingers of the user's left hand 602, and this may be accurately correlated to, and rendered as, amounts of flexion/extension of the fingers the virtual hand 604. Thus, a change in the flexion/extension of a finger of the user's left hand 602 as determined from the sensed input is reflected as a change in the flexion/extension of the corresponding finger of the virtual hand 604.

However, as noted above, due to the presence of the controller device 104a (and/or the user's own operational hand maneuvers), the user might not form a tight first hand pose, or might be incapable of actually doing so. Therefore, in some implementations, when the sensed input from the controller device 104a indicates that the user's hand pose sufficiently resembles a tight fist, then the virtual hand 604 is rendered as having a tight first hand pose, as shown with reference to FIG. 6C. That is, when the sensed input from the controller device 104a is determined to exceed a threshold degree of similarity to a target input, then the virtual hand 604 will be rendered in the virtual space as having a tight first hand pose. In this manner, the virtual hand 604 will exhibit freedom of movement of the fingers in response to movements of the user's fingers sensed by the controller device 104a, so long as the degree of similarity of the sensed input to the target input does not exceed the threshold level. Whereas the virtual hand 604 will be rendered as a tight first so long as the sensed input exceeds the threshold degree of similarity to the target input, irrespective of changes in the sensed input. That is, as long as the sensed input continues to exceed the threshold degree of similarity to the target input, then changes in the sensed input (e.g. resulting from changes in the postures of the user's fingers) will not change the pose of the virtual hand 604, as it continues to be rendered with a tight first hand pose.

Though in the present implementation, the virtual hand 604 has been described as "snapping" to the predefined hand pose of a tight first when the sensed input exceeds a threshold degree of similarity to a target input, it should be appreciated that the transition of the virtual hand 604 to the tight first hand pose can be animated as a smooth transition. This can include animating transitions of the individual fingers of the virtual hand 604 from their current postures (e.g. the postures as shown at FIG. 6B) to their postures as defined by the predefined first hand pose (e.g. the postures shown at FIG. 6C). In effect, the virtual hand 604 will be rendered so as to exhibit an animated transition that gradually closes the virtual hand 604 into a fist. This can provide a more natural-looking transition to the first hand pose. In effect, the transitional animation entails generating transitional poses by blending between the current hand pose and the target predefined first hand pose, based on each finger's sensor values. In some implementations, the blend amount can be conceptualized as the remainder of the normalized scores of the predefined hand pose that are being used. For example, the transitional animation equals 1.0 minus the predefined pose score total.

It will be appreciated that an animated transition may be provided in the reverse situation, wherein the degree of similarity of the sensed input to the target input changes from exceeding the threshold to not exceeding the threshold. For example, with continued reference to the presently described implementation, the virtual hand 604 may be animated to smoothly transition from the closed first hand pose shown at FIG. 6C, to the hand pose shown at FIG. 6B (one defined by and changing in response to sensed input from the controller device 104a). The effect will be of the virtual hand 604 gradually opening and then the fingers of the virtual hand 604 becoming responsively articulated based on user input.

Though the foregoing implementation has been described with reference to a first hand pose specifically, it will be appreciated that the concepts described can be applied to any hand pose, as well as any type of controller device that senses the user's hand pose, including sensing postures of the user's fingers.

FIG. 7A illustrates a user interacting with a virtual space viewed through an HMD, in accordance with implementations of the disclosure. The user 100 is shown operating controller devices 104a and 104b with their left and right hand, respectively. The controller devices are configured to detect the poses of the user's hands, and corresponding virtual hands in the virtual space can be rendered based on the poses of the user's hands (e.g. in a manner that mimics the poses of the user's hands). As has been described above, the controller device 104a/b may detect the postures of individual fingers of a hand of the user 100, and the postures of corresponding fingers of a corresponding virtual hand can be rendered in a similar or same fashion. This imparts a sense of realism to the virtual reality experience stemming in part from the real-time control of the postures of the fingers of the virtual hands.

In the expanded view 700 showing the user's right hand 702 operating the controller device 104b, it can be seen that the thumb and index finger of the user's right hand 702 are flexed/curled around the controller device 104b, while the middle, ring, and pinky fingers are extended. This hand pose can be rendered as shown at FIG. 7B, so that the corresponding avatar virtual hand 704 accurately mimics the pose of the user's right hand 702.

However, in some implementations, it is desirable to render the pose of the virtual hand 704 in a different manner. For example, the user's hand pose as shown at FIG. 7A may be indicative of the user's intent to pinch a virtual object in the virtual space. And therefore, the virtual hand 704 can instead be rendered according to a predefined hand pose as shown at FIG. 7C, in a manner that renders an aesthetically pleasing pinch hand pose. It will be appreciated that though the actual thumb and index finger of the user's right hand 702 are not touching at the fingertips, in the rendered pinch hand pose shown at FIG. 7C, the fingertips of the thumb and index finger of the virtual hand 704 are touching or very near to touching. Furthermore, though the actual middle, ring, and pinky fingers of the user's right hand 702 are extended straight out, in the rendered pinch hand pose shown at FIG. 7C, these fingers are slightly curled and splayed/fanned in a progressive fashion as shown that is aesthetically pleasing.

In some implementations, the rendering of the virtual hand 704 can be configured so that the predefined pinch hand pose shown at FIG. 7C is formed when the sensed input from the controller device 104b is determined to be sufficiently similar to a target input, e.g. when the degree of similarity between the sensed input and the target input exceeds a predefined threshold. By way of example without limitation, the sensed input may be defined by sensed data values from sensors of the controller device 104b, such as proximity sensors, triggers, flex sensors, etc. or any other sensors that may sense and quantify an aspect of the posture of a finger of the user's right hand 702. In some implementations, the sensors detect flexion/extension of the fingers of the user's right hand 702. In some implementations, the sensed input includes a set of sensed data values from sensors that correspond to each of the fingers of the user's right hand 702. The target input is defined by a set of corresponding target values for each of the sensed data values.

For example, considering one of the fingers, such as the index finger by way of example, the controller device 104b may include an index finger sensor that detects flexion of the index finger, and thus the sensed input includes a sensed data value from the index finger sensor that indicates an amount of flexion of the user's right hand index finger. Similarly, the controller device 104b may include corresponding sensors for each of the other fingers, which indicate the amounts of flexion of the other fingers. Thus, the sensed input includes sensed data values from each of these sensors, thereby indicating the amounts of flexion of each of the fingers of the user's right hand 702.

The target input consists of target data values for each of the sensors, thus defining a target hand pose for the user's right hand 702. When the sensed data values from the sensors are collectively determined to be similar to the target data values so as to exceed a threshold level of similarity, then the virtual hand 704 may be rendered as having the predefined pinch hand pose, as shown in the illustrated implementation. It should be appreciated that so long as the threshold level of similarity between the sensed data values and the target data values continues to be exceeded, then changes in the sensed data values (e.g. caused by a change in the posture of at least one finger) will not affect the hand pose that is rendered for the virtual hand 704. The predefined pinch hand pose is maintained until the degree of similarity no longer exceeds the threshold level.

While the foregoing has been described with reference to a predefined pinch hand pose, it will be appreciated that the principles may apply to any other hand pose, without limitation. Additionally, though reference has been made to the controller device 104b having one sensor per finger, it will be appreciated that there may be multiple sensors per finger, and hence multiple sensed data values per finger and corresponding target data values. As has been noted above, multiple sensors can be utilized to detect the posture of a given finger.

In some implementations, the similarity of a sensed input set to a target input set can be determined as follows.

$$E = W_1 \left( \frac{S_1 - T_1}{R_1} \right)^2 + W_2 \left( \frac{S_2 - T_2}{R_2} \right)^2 +$$
$$W_3 \left( \frac{S_3 - T_3}{R_3} \right)^2 + W_4 \left( \frac{S_4 - T_4}{R_4} \right)^2 + W_5 \left( \frac{S_5 - T_5}{R_5} \right)^2$$
$$W_1 + W_2 + W_3 + W_4 + W_5 = P$$
$$M = f(E)$$

E is the overall deviation of a sensed controller input set from a target input set. The value of E is positively correlated to the deviation, such that increasing values of E indicate greater deviation of the sensed controller input from the target input set.

The sensed controller input set consists of sensed input values from controller sensors that correspond to each of the fingers of the user's hand, wherein $S_x$ is the sensed input value for a finger x.

The target input set consists of target input values corresponding to each of the fingers of the user's hand, wherein $T_x$ is the target input value for a finger x.

$R_x$ is an optional scaling factor used to scale the raw difference between a given sensed input value from its corresponding target input value ($S_x-T_x$). For example, in some implementations, $R_x$ is equal to the maximum possible deviation of $S_x$ from $T_x$, which will scale the difference to one.

$W_x$ is a weighting factor applied to the squared difference between a given sensed input value and its corresponding target input value. The weighting factors can be configured/adjusted to enable certain ones of the sensed input values to exert greater or lesser influence relative to other ones of the sensed input values.

In some implementations, the weighting factors sum to a predefined value P in order to normalize/scale the deviation function. For example, when $R_x$ is equal to the maximum possible deviation of $S_x$ from $T_x$, as discussed above, then in some implementations, P=1, which scales the value of E to one.

M is a similarity indicator indicating a degree or amount of similarity of the sensed controller input to the target input set, that is determined as a function of E, wherein M is inversely correlated to B In other words, as the deviation E decreases, the similarity M increases. For example, in some implementations, M is expressed as follows:

$$M = \frac{E_{max} - E}{E_{max}}$$

where $E_{max}$ is the maximum possible value for E. In implementations wherein $E_{max}$ has been normalized to one, then M=1−E.

As has been described, when the similarity M exceeds a threshold level, then the virtual hand is rendered as having a predefined hand pose.

It should be appreciated that in some implementations, the similarity of the sensed controller input to the target input is defined in terms of the deviation being less than a threshold level. In other words, the virtual hand is rendered as having the predefined hand pose when the deviation of the sensed controller input from the target input is less than a threshold amount.

The foregoing is one example of a method for determining the similarity of controller input values to target input values, and is provided by way of example without limitation. In other implementations, any of various other methods for determining similarity of sets of values can be applied. Further, though single sensed controller input values for each finger of a hand have been described, it should be appreciated that there may be any number of sensed controller input values for each finger of the hand, and that these may have corresponding target values.

While the foregoing has generally been described with reference to a single predefined hand pose that a virtual hand may "snap to," it should be appreciated that in various implementations, there may be any number of predefined hand poses that the virtual hand may be rendered to have when the user's hand pose sufficiently approximates it (e.g. as defined by similarity of sensed input to target input exceeding a threshold level).

Figure 8:
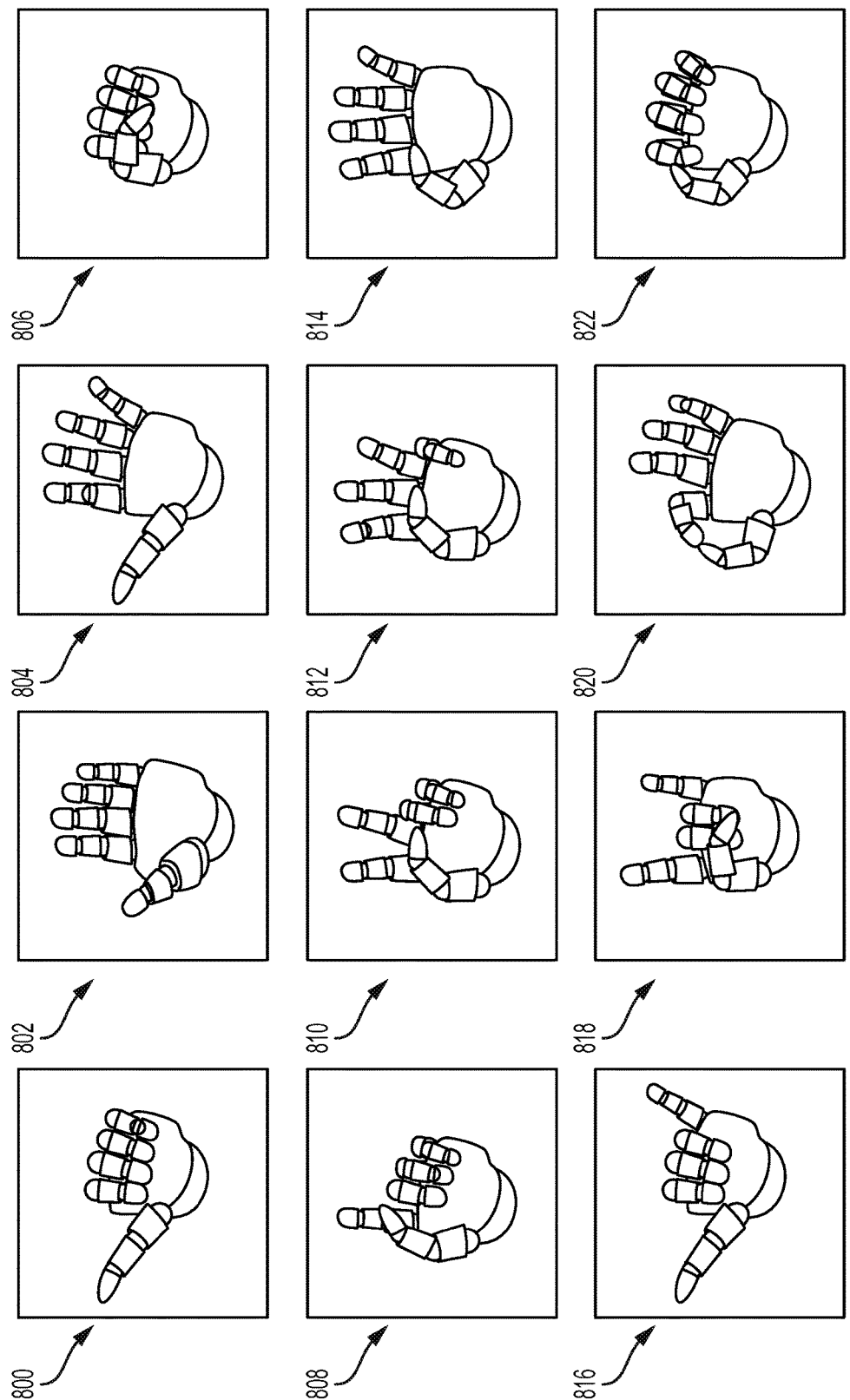
FIG. 8 illustrates a variety of possible hand poses, in accordance with implementations of the disclosure.

FIG. 8 illustrates a variety of possible hand poses, in accordance with implementations of the disclosure. In the hand pose 800, the thumb is extended, while the remaining fingers are flexed/closed. In some implementations, the hand pose 800 might be used or interpreted as a thumbs up or hitchhiking pose. Hand pose 802 is an open hand with all fingers extended, but with the index, middle, ring, and pinky fingers adducted next to each other. By way of example without limitation, hand pose 802 could be used for clapping. Hand pose 804 is another open handed pose but with the fingers abducted so as to be spread apart. By way of example without limitation, hand pose 804 could be used for grasping an object, catching an object, or playing rock-paper-scissors.

Hand pose 806 is a closed fist, which by way of example without limitation, could be used for punching in a virtual space. Hand pose 808 provides for the index finger to be extended, with the remaining fingers generally flexed/closed. Hand pose 808 could be used for pointing, indicating the number one, touching a virtual object in the virtual space, etc.

Hand pose 810 is a pose with two fingers extended, and may indicate the number two, a peace sign, happiness, etc. Hand pose 812 is a pose with three fingers extended. Hand pose 814 is a pose with four fingers extended and the thumb folded in.

Hand pose 816 is a pose with the thumb and pink extended, and the remaining fingers curled. Hand pose 818 is a pose with the index and pinky fingers extended, and the other fingers curled.

Hand pose 820 is a pose with the thumb and index finger forming a pinch. Hand pose 822 is a partially closed hand, with all fingers curled, but not tightly as in a fist.

These poses have been shown and described by way of example without limitation. It should be appreciated that there may be any number of additional possible predefined hand poses in accordance with which a virtual hand may be rendered.

In some implementations, the hand poses include sign language hand poses, which can be utilized to facilitate sign language in virtual reality environments.

In various implementations, systems employing the herein described predefined hand poses may be configured to activate different ones of the predefined hand poses depending upon the context of the user's interaction in the virtual space, including contextual factors such as, the level or stage or environmental context of the interaction (such as in a video game), a task to be performed in the virtual space, the location of the user's hand, the orientation of the user's hand, the motion of the user's hand (including speed, trajectory, change in orientation, etc.), a recognized gesture made by the user's hand, etc. It will be appreciated that any such factors may be applied in combination with each other to determine when the activate a given predefined hand pose for rendering.

Figure 9A:
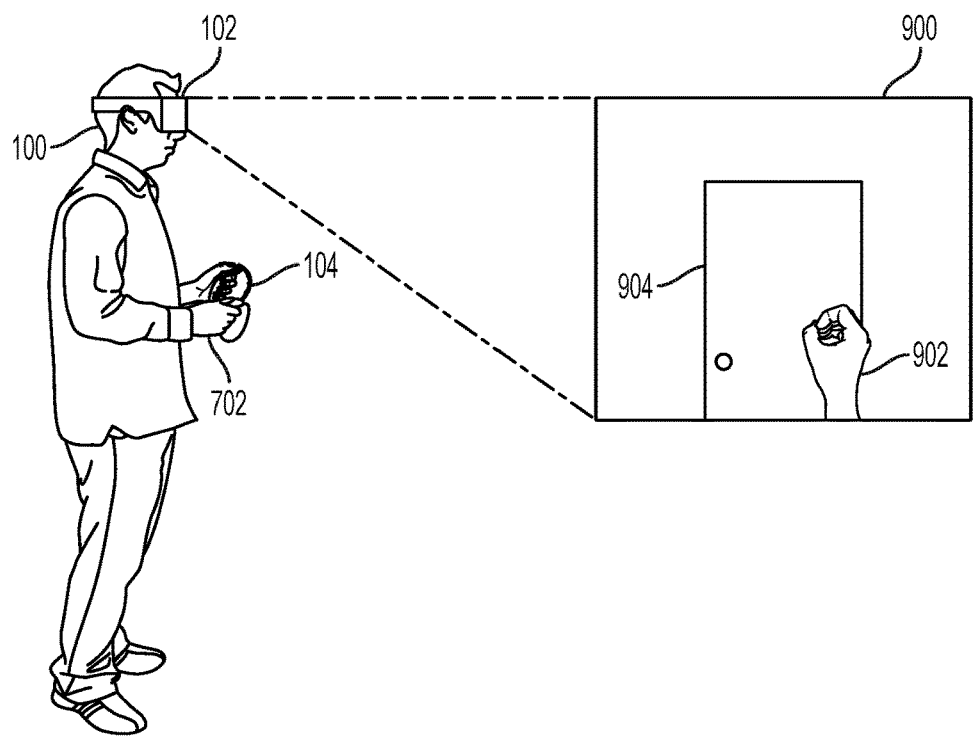
FIGS. 9A and 9B illustrate a user interacting in a virtual space viewed through an HMD, in accordance with implementations of the disclosure.

FIG. 9A illustrates a user interacting in a virtual space viewed through an HMD, in accordance with implementations of the disclosure. The user 100 operates a controller device 104 with their right hand 702 as shown in the illustrated implementation, and a corresponding virtual hand 902 is rendered in the virtual space as shown in the illustrated view 900 of the virtual space that is rendered through the HMD 102. In the illustrated implementation, the context of the interaction is such that a door 904 is in front of the user 100 avatar. Thus, based on this context, a predefined hand pose for grasping the doorknob of the door 904 may be activated, so that when the user defined controller input received from the controller device 104 matches a target input to a sufficient degree, then the virtual hand 902 is rendered as having the predefined grasping hand pose.

In another implementation, the predefined grasping hand pose is activated based on the motion of the user's right hand 702, as determined from the controller input received from the controller device 104. For example, the system may be configured so that when the movement of the user's hand 702 is below a certain speed, then the grasping hand pose is activated.

Instead of the predefined grasping hand pose being activated based on the above-cited factors for the illustrated implementation, in another implementation, no predefined hand pose is activated. That is, for example, based on the locational context (the location of the user (avatar) in front of a door), or the motion of the user's hand (e.g. being less than a threshold speed), then no predefined hand pose is activated.

Figure 9B:
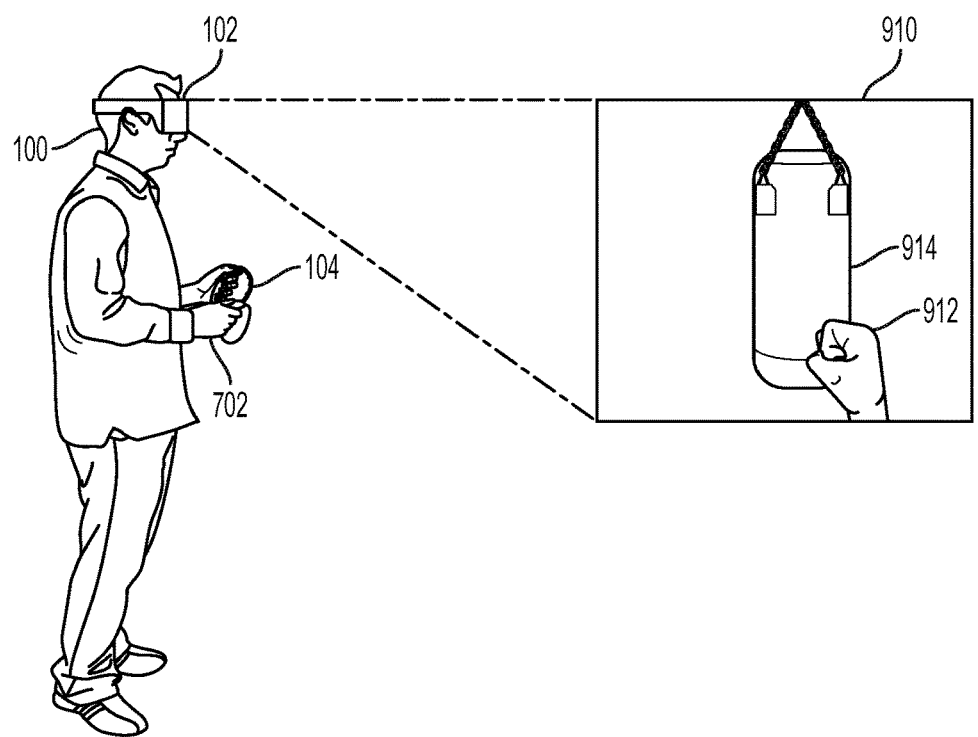

FIG. 9B illustrates the user 100 operating the controller device 104 and viewing the virtual space through the HMD 102, but in a different context. As shown by the view 910 of the virtual space that is rendered on the HMD 102, the context of the interaction is such as to include a punching bag 914. Thus, based on this context of interaction, a first hand pose may be activated for use, so that when the sensed controller input from the controller device 104 sufficiently matches a target input, the corresponding virtual hand 912 is rendered as a fist, as shown in the illustrated implementation.

In some implementations, the first hand pose is activated based on the motion of the user's hand 702. For example, it may be detected that the user has raised their hand and pulled it back as if preparing to throw a punch. Recognition of this movement may provide a basis to activate the first hand pose, so that the virtual hand 912 is rendered as a first based on the controller input as previously described. It will be appreciated that the predefined first pose may also be activated in response to the recognized movement of the user's hand in throwing a punch, for example, as recognized by a forward motion of the user's hand, and possibly at a speed that exceeds a predefined threshold.

It will be appreciated that interactive applications, including video games, can be configured to invoke different predefined hand poses, and to invoke different predefined hand poses at different stages or other contexts of interactivity. Thus, the particular hand poses that are activated may change over time in response to changes in context and in response to user-initiated activity such as movements of the user's hands, arms and avatar.

For example, when a user engages in a game of rock-paper-scissors, then the open hand pose 804, the first hand pose 806, and the two-finger hand pose 810, as described above with reference to FIG. 8, may be selected and activated for use.

In some implementations, when a user is attempting grasp a virtual object in the virtual space, then the open hand pose 804 is activated, whereas if it is detected that the user is attempting another kind of activity such as performing a slap motion or a clapping motion, then the open hand pose 802 is activated. In this example, the same sensed input provided by the user through a controller device results in different virtual hand renderings depending upon the context of interactivity.

Figure 10A:
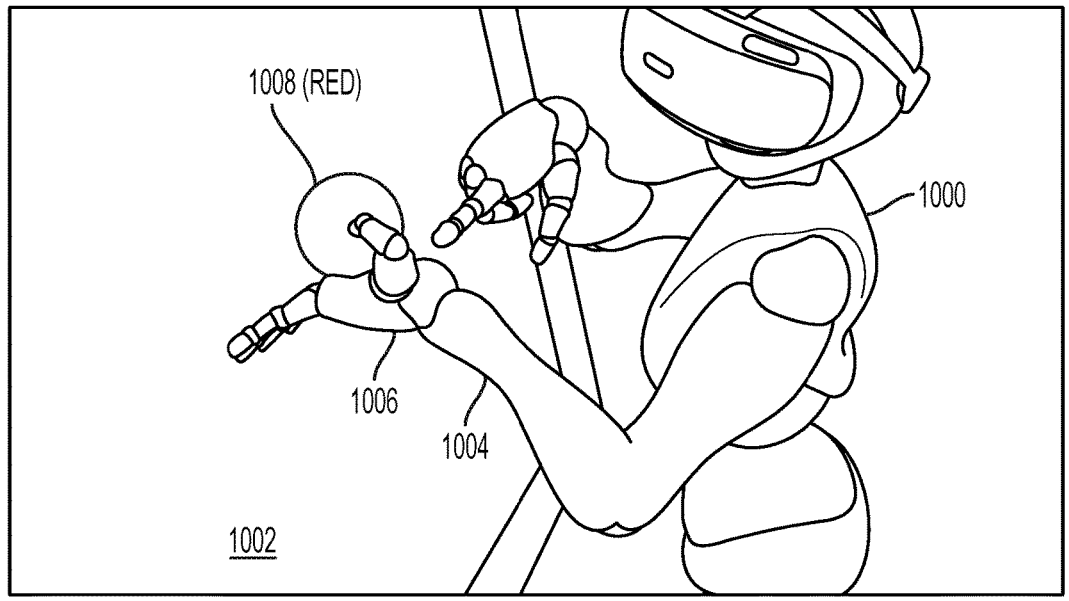
FIGS. 10A, 10B, 10C, and 10D illustrate an avatar in a virtual space, in accordance with implementations of the disclosure.

FIG. 10A illustrates an avatar in a virtual space, in accordance with implementations of the disclosure. In the illustrated implementation, the avatar 1000 has virtual hands that are controlled by sensed input from controllers. The avatar 1000 is standing in front of a board 1002, on which it is possible draw or paint with the fingers of the virtual hands. In some implementations, in order to control the color that is available for drawing/painting, when forearm 1004 is supinated and the hand 1006 is oriented palm side up, then a color indicator ball 1008 is rendered in the palm of the hand 1006. In some implementations, by touching the ball 1008 with the fingers of the hand 1006, it is possible to adjust/change/control the color available for drawing. For example, touching the color indicator ball 1008 with the index, middle, ring, or pinky fingers may increase the relative amount of a color, such as red, green, or blue, whereas touching the color indicator ball 1008 with the thumb may cause the color to be reduced in intensity.

Figure 10B:
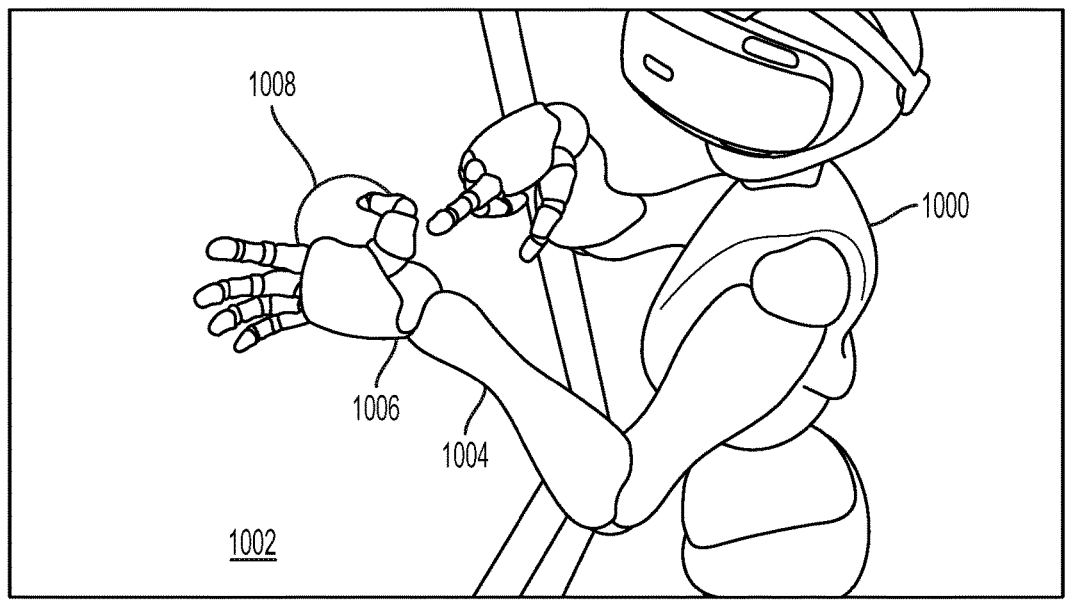
Figure 10C:
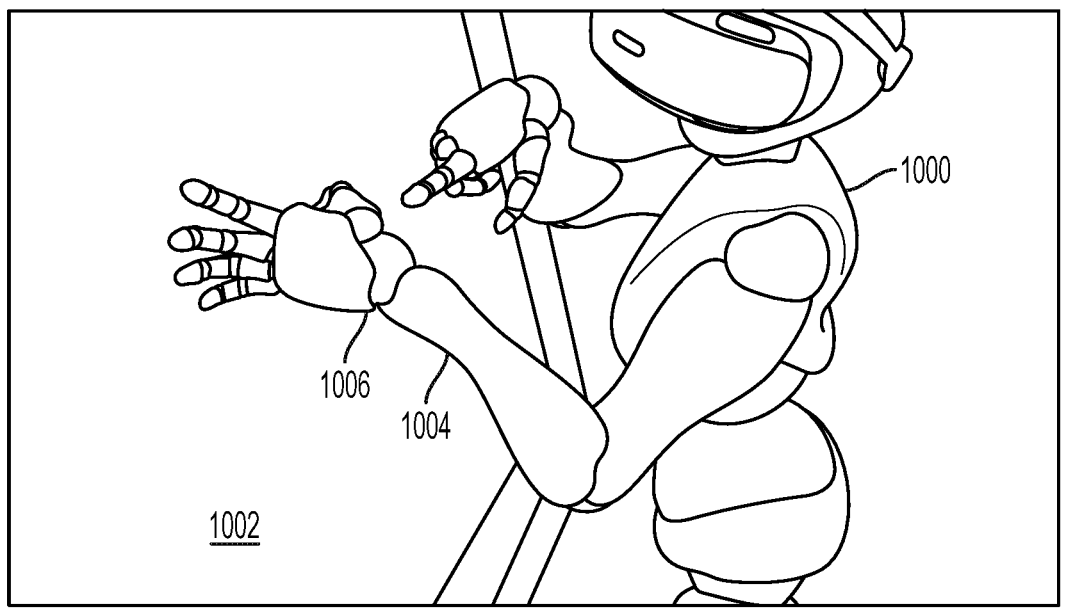
Figure 10D:
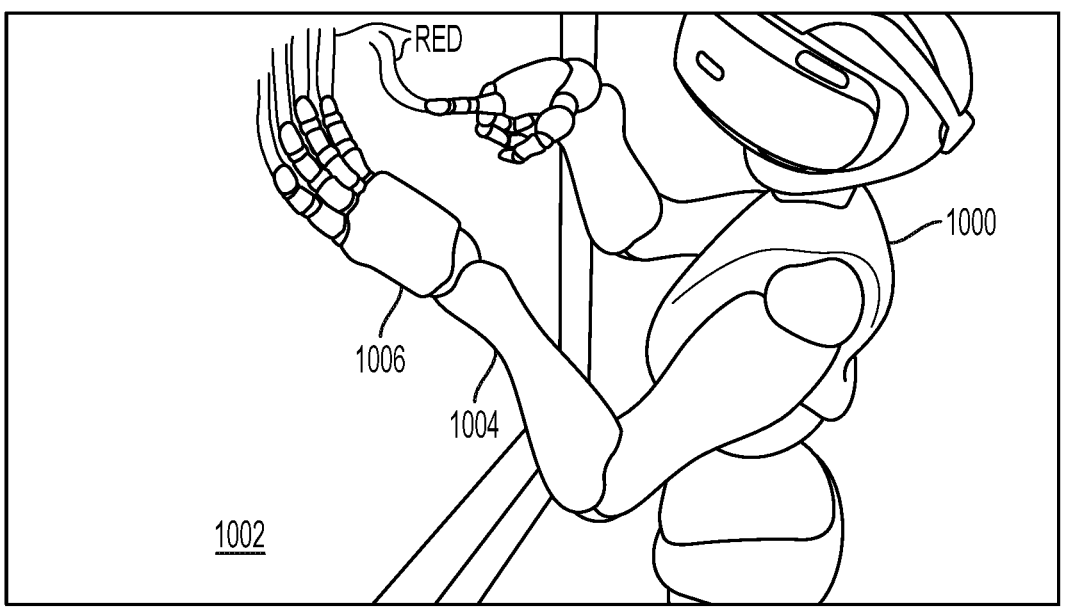

At FIG. 10B, the forearm 1004 has pronated somewhat relative to the position shown at FIG. 10A, rotating the palm of the virtual hand 1006 towards vertical. At FIG. 10C, the forearm 1004 has continued to pronate such that the palm of the virtual hand 1006 has rotated past vertical and past a threshold at which two events occur. First, the color indicator ball is no longer rendered. Second, a predefined hand pose is invoked for the virtual hand 1006 that tucks/folds/flexes the thumb of the virtual hand 1006 inward towards the palm of the virtual hand 1006. This predefined hand pose is configured to enable painting with the index, middle, ring, and pinky fingers of the virtual hand 1006, while the thumb stays out of the way. This is more clearly shown at FIG. 10D, wherein the forearm 1004 has pronated further, and the index, middle, ring, and pinky fingers of the hand 1006 are positioned facing out and prepared to finger paint on the board 1002.

FIGS. 11A-E illustrate graphs showing the amounts of extension of different fingers of a user's hand over time, in accordance with implementations of the disclosure. The illustrated amounts of extension can be determined from sensors on a controller device 104, as described above. The extension of each finger is on a scale of zero to 10, which is arbitrarily chosen for purposes of explaining principles of the present disclosure. Broadly speaking, a value of zero indicates minimal extension of a given finger, whereas a value of 10 indicates maximum extension.

Figure 11A:
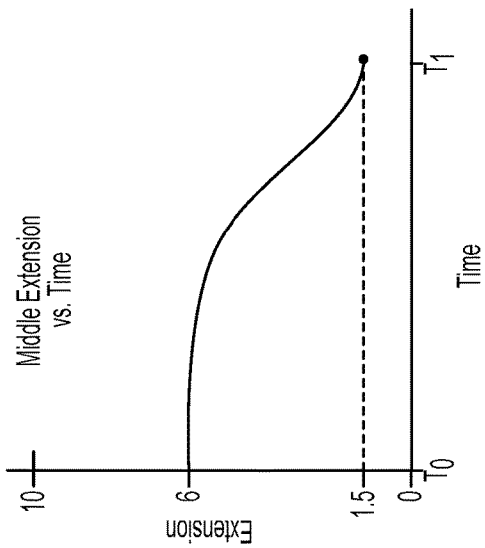
FIGS. 11A, 11B, 11C, 11D, and 11E illustrate graphs showing the amounts of extension of different fingers of a user's hand over time, in accordance with implementations of the disclosure.
Figure 11B:
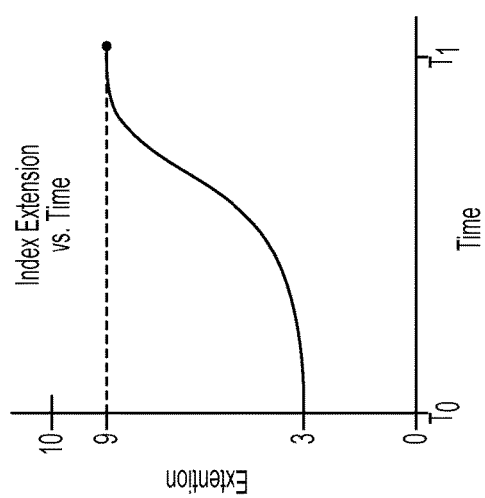
Figure 11D:
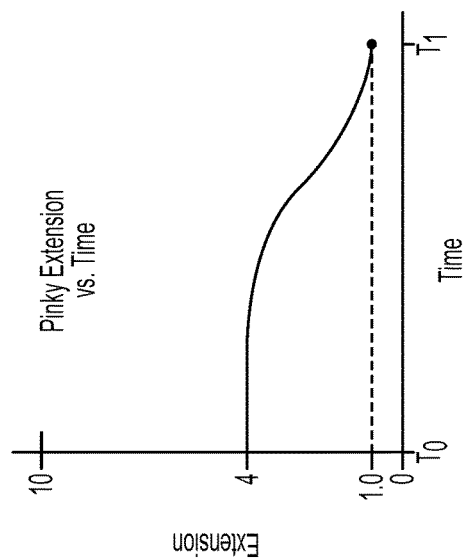
Figure 11C:
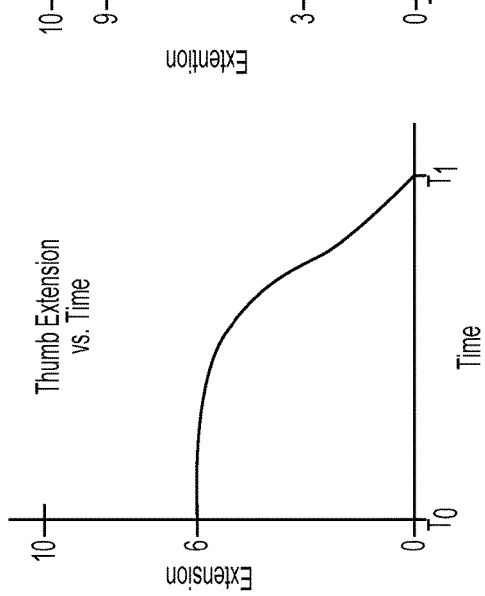
Figure 11E:
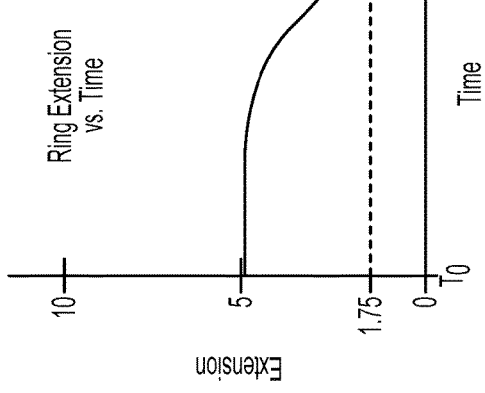

As shown at FIG. 11A, the extension of the thumb changes from a value of 6 at time $T_0$ to a value of zero at time $T_1$. As shown at FIG. 11B, the extension of the index finger changes from a value of 3 at time $T_0$ to a value of 9 at time $T_1$. As shown at FIG. 11C, the extension of the middle finger changes from a value of 6 at time $T_0$ to a value of 1.5 at time $T_1$. As shown at FIG. 11D, the extension of the ring finger changes from a value of 5 at time $T_0$ to a value of 1.75 at time $T_1$. As shown at FIG. 11E, the extension of the pinky finger changes from a value of 4 at time $T_0$ to a value of 1 at time $T_1$.

Prior to the time $T_1$, the fingers of a corresponding virtual hand may be freely maneuverable in response to changes in the extension of the user's fingers (e.g. as detected by sensors of a controller device 104). However, at time $T_1$, then the rendering of the virtual hand may "snap" or conform to a predefined hand pose. By way of example without limitation, in the illustrated implementation, the predefined hand pose may be the hand pose 808 shown at FIG. 8, wherein the index finger is fully extended, and the remaining fingers are flexed, possibly for purposes of pointing, indicating the number one, touching a virtual object or other rendered item in the virtual space, etc.

The transformation to the predefined hand pose at time $T_1$ may occur due to the pose of the user's hand reaching a certain level of conformance to the predefined hand pose. In some implementations, this may entail the extension values for each of the fingers simultaneously falling within respective predefined ranges. In some implementations, this may entail the extension values for the fingers reaching a threshold level of similarity to a target set of extension values. It should be appreciated that the use of extension values in the present implementation is one example of a measure of the posture of the user's fingers. Generalizing the concept, in implementations of the disclosure, the transformation to the predefined hand pose may be triggered by the measured postures of the user's fingers, e.g. as defined by sensor data values or values processed from sensor data, falling within predefined ranges or reaching a threshold level of similarity to predefined target values.

Figure 12:
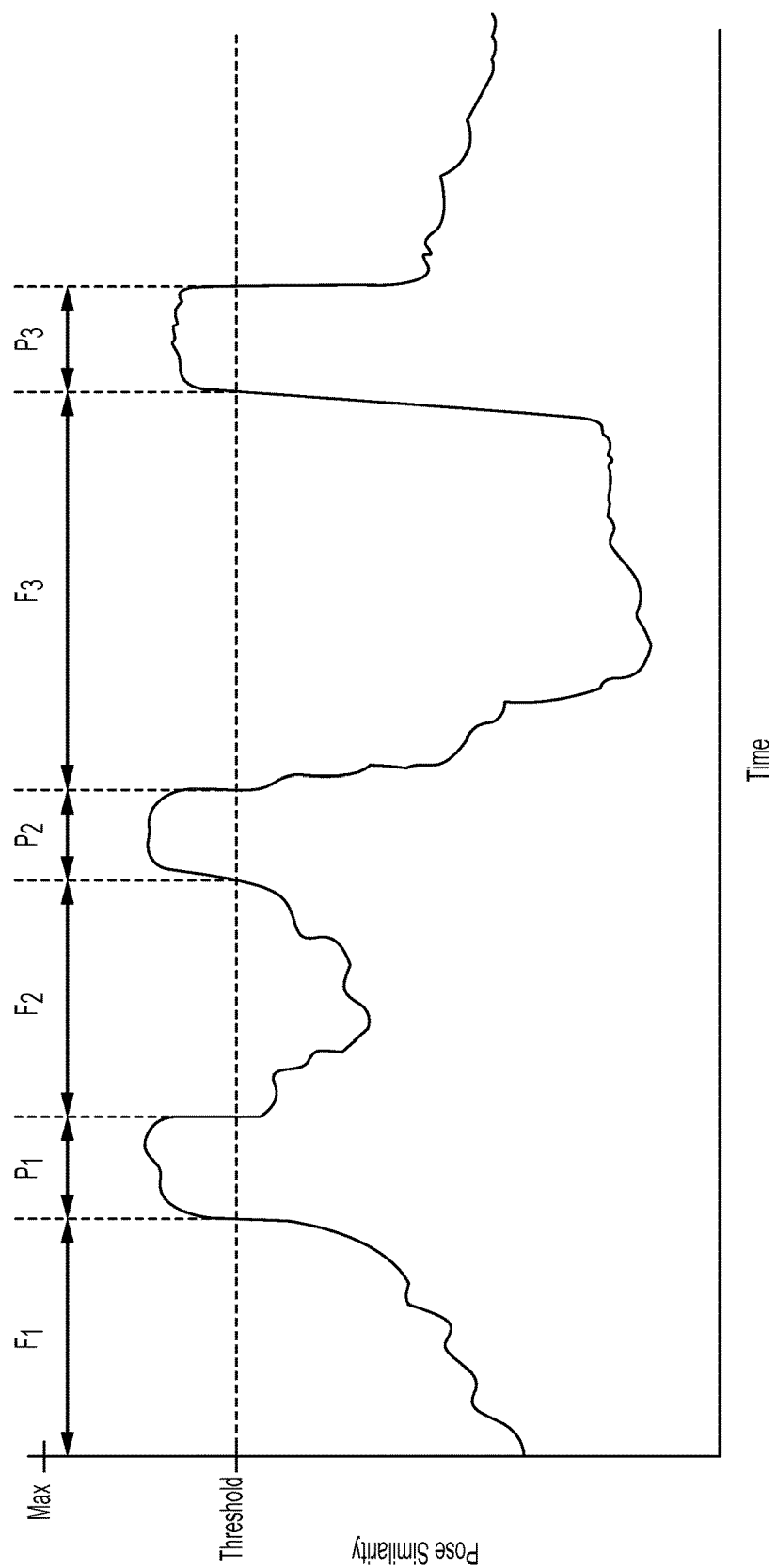
FIG. 12 is a graph showing similarity of a user's hand pose to a target hand pose over time, in accordance with implementations of the disclosure.

FIG. 12 is a graph showing similarity of a user's hand pose to a target hand pose over time, in accordance with implementations of the disclosure. In the illustrated implementation, the pose similarity varies over time. When the pose similarity reaches a threshold level, then the pose of a corresponding virtual hand in a virtual space is rendered as having a predefined hand pose, in effect "snapping" to the predefined hand pose. These periods of time are denoted as periods $P_1$, $P_2$, and $P_3$. Whereas during the periods of time that the pose similarity does not exceed the threshold, indicated as periods $F_1$, $F_2$, and $F_3$, then the rendering of the virtual hand is not conformed to the predefined hand pose, but instead is responsively rendered in real-time according to the postures of the fingers of the user's hand. During the periods $P_1$, $P_2$, and $P_3$, even changes in the postures of the user's fingers do not cause changes in the pose of the virtual hand as the level of similarity remains above the threshold. However, during the periods $F_1$, $F_2$, and $F_3$, any change in posture of a user's finger is immediately rendered in real-time as a change in the posture of the corresponding finger of the virtual hand in the virtual space.

Figures 1, 13A:
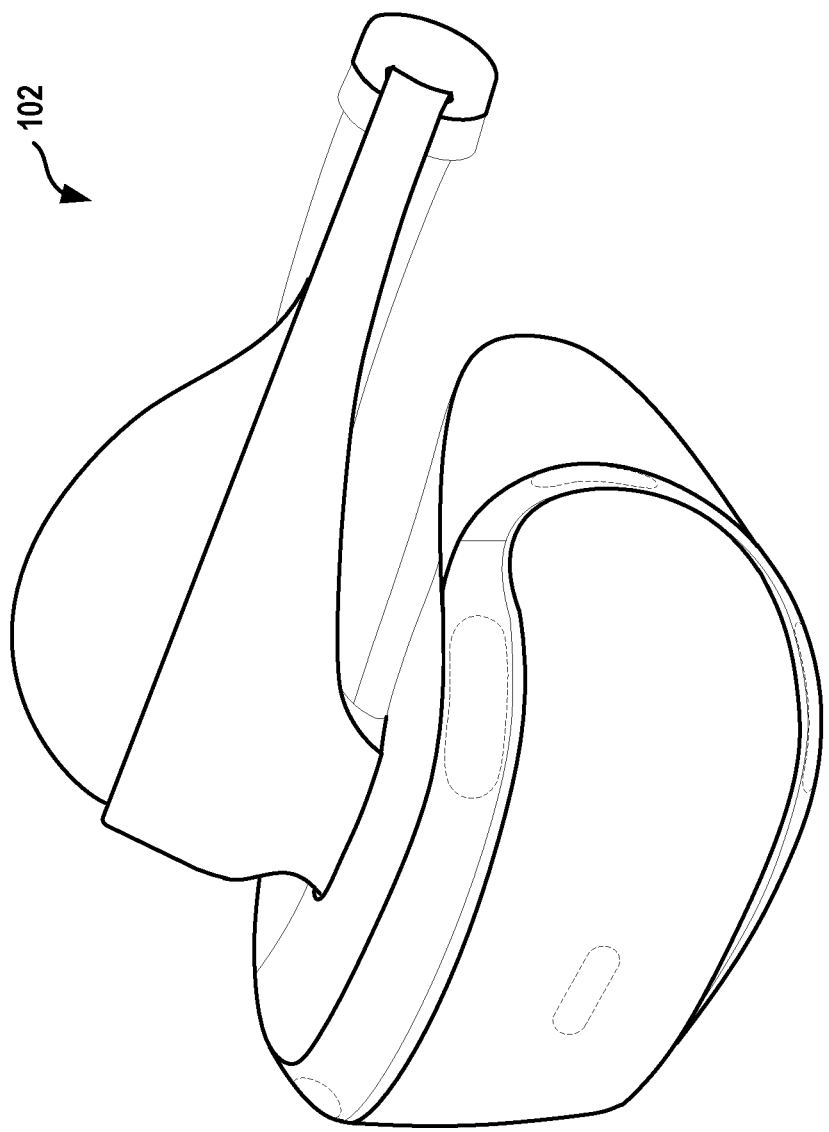
Figures 2, 13A:
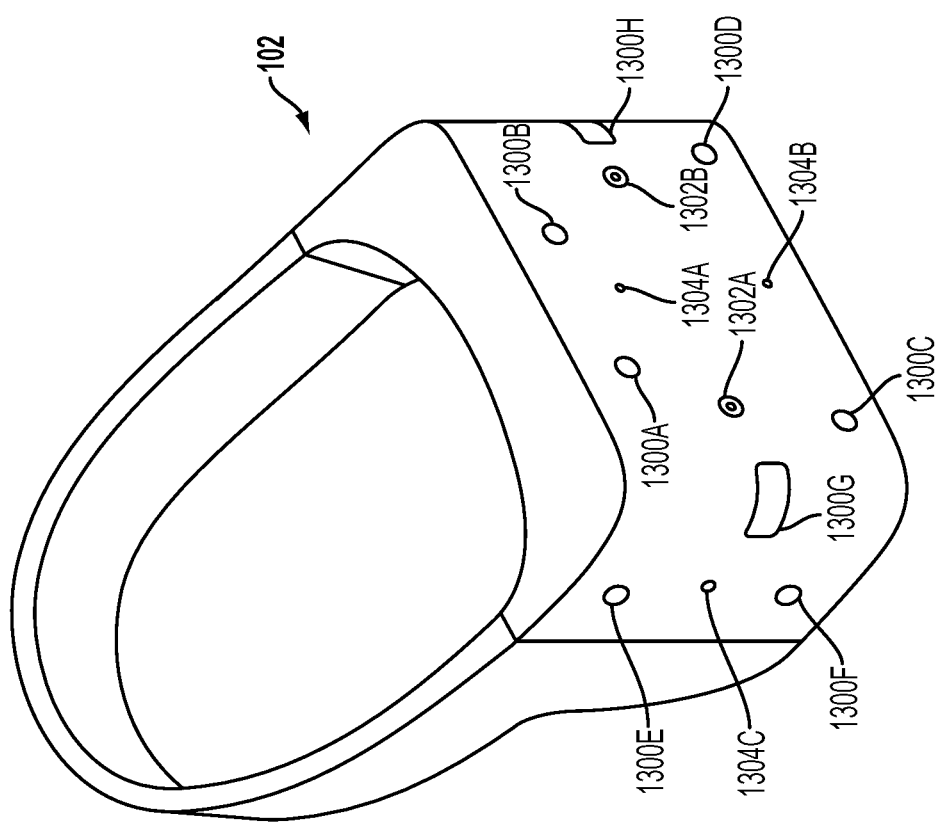

FIGS. 13A-1 and 13A-2 illustrate a head-mounted display (HMD), in accordance with an implementation of the disclosure. FIG. 13A-1 in particular illustrates the Playstation® VR headset, which is one example of a HMD in accordance with implementations of the disclosure. As shown, the HMD 102 includes a plurality of lights 1300A-H. Each of these lights may be configured to have specific shapes, and can be configured to have the same or different colors. The lights 1300A, 1300B, 1300C, and 1300D are arranged on the front surface of the HMD 102. The lights 1300E and 1300F are arranged on a side surface of the HMD 102. And the lights 1300G and 1300H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 1300G and 1300H) may be exposed for image capture depending upon the orientation of the HMD 102 relative to the image capture device.

In one implementation, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated implementation, the HMD 102 includes microphones 1304A and 1304B defined on the front surface of the HMD 102, and microphone 1304C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated implementation, the HMD 102 is shown to include image capture devices 1302A and 1302B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 1302A and 1302B (e.g., or one or more external facing (e.g. front facing) cameras disposed on the outside body of the HMD 102) can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated implementation, two cameras are shown on the front surface of the HMD 102, it will be appreciated that there may be any number of externally facing cameras installed on the HMD 102, oriented in any direction. For example, in another implementation, there may be cameras mounted on the sides of the HMD 102 to provide additional panoramic image capture of the environment. Additionally, in some implementations, such externally facing cameras can be used to track other peripheral devices (e.g. controllers, etc.). That is, the location/orientation of a peripheral device relative to the HMD can be identified and tracked in captured images from such externally facing cameras on the HMD, and using the known location/orientation of the HMD in the local environment, then the true location/orientation of the peripheral device can be determined.

Figure 13B:
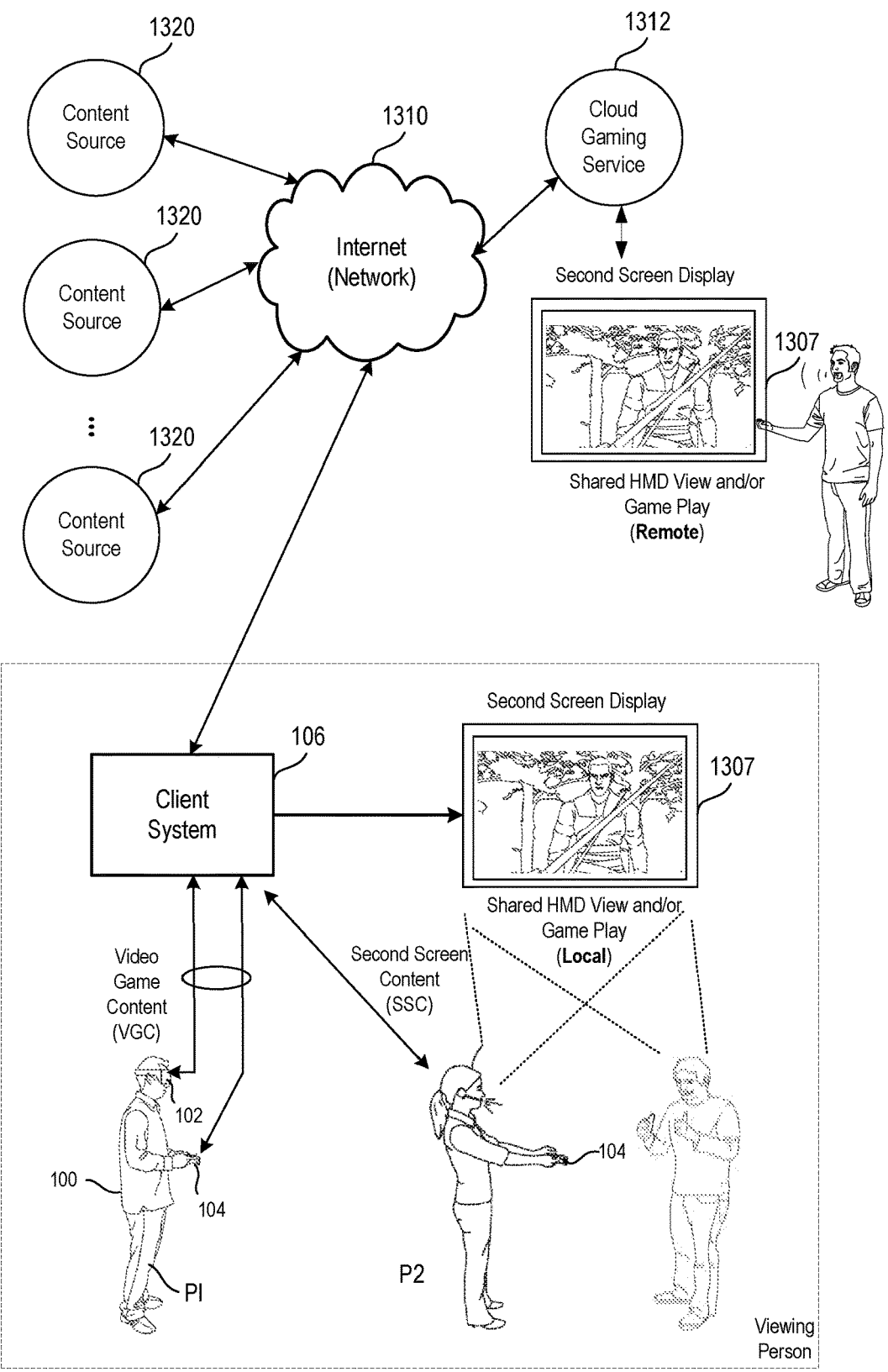
FIG. 13B illustrates one example of an HMD user interfacing with a client system, and the client system providing content to a second screen display, which is referred to as a second screen, in accordance with one implementation.

FIG. 13B illustrates one example of an HMD 102 user 100 interfacing with a client system 106, and the client system 106 providing content to a second screen display, which is referred to as a second screen 1307. The client system 106 may include integrated electronics for processing the sharing of content from the HMD 102 to the second screen 1307. Other implementations may include a separate device, module, connector, that will interface between the client system and each of the HMD 102 and the second screen 1307. In this general example, user 100 is wearing HMD 102 and is playing a video game using a controller, which may also be interface object 104. The interactive play by user 100 will produce video game content (VGC), which is displayed interactively to the HMD 102.

In one implementation, the content being displayed in the HMD 102 is shared to the second screen 1307. In one example, a person viewing the second screen 1307 can view the content being played interactively in the HMD 102 by user 100. In another implementation, another user (e.g. player 2) can interact with the client system 106 to produce second screen content (SSC). The second screen content produced by a player also interacting with the controller 104 (or any type of user interface, gesture, voice, or input), may be produced as SSC to the client system 106, which can be displayed on second screen 1307 along with the VGC received from the HMD 102.

Accordingly, the interactivity by other users who may be co-located or remote from an HMD user can be social, interactive, and more immersive to both the HMD user and users that may be viewing the content played by the HMD user on a second screen 1307. As illustrated, the client system 106 can be connected to the Internet 1310. The Internet can also provide access to the client system 106 to content from various content sources 1320. The content sources 1320 can include any type of content that is accessible over the Internet.

Such content, without limitation, can include video content, movie content, streaming content, social media content, news content, friend content, advertisement content, etc. In one implementation, the client system 106 can be used to simultaneously process content for an HMD user, such that the HMD is provided with multimedia content associated with the interactivity during gameplay. The client system 106 can then also provide other content, which may be unrelated to the video game content to the second screen. The client system 106 can, in one implementation receive the second screen content from one of the content sources 1320, or from a local user, or a remote user.

Figure 14:
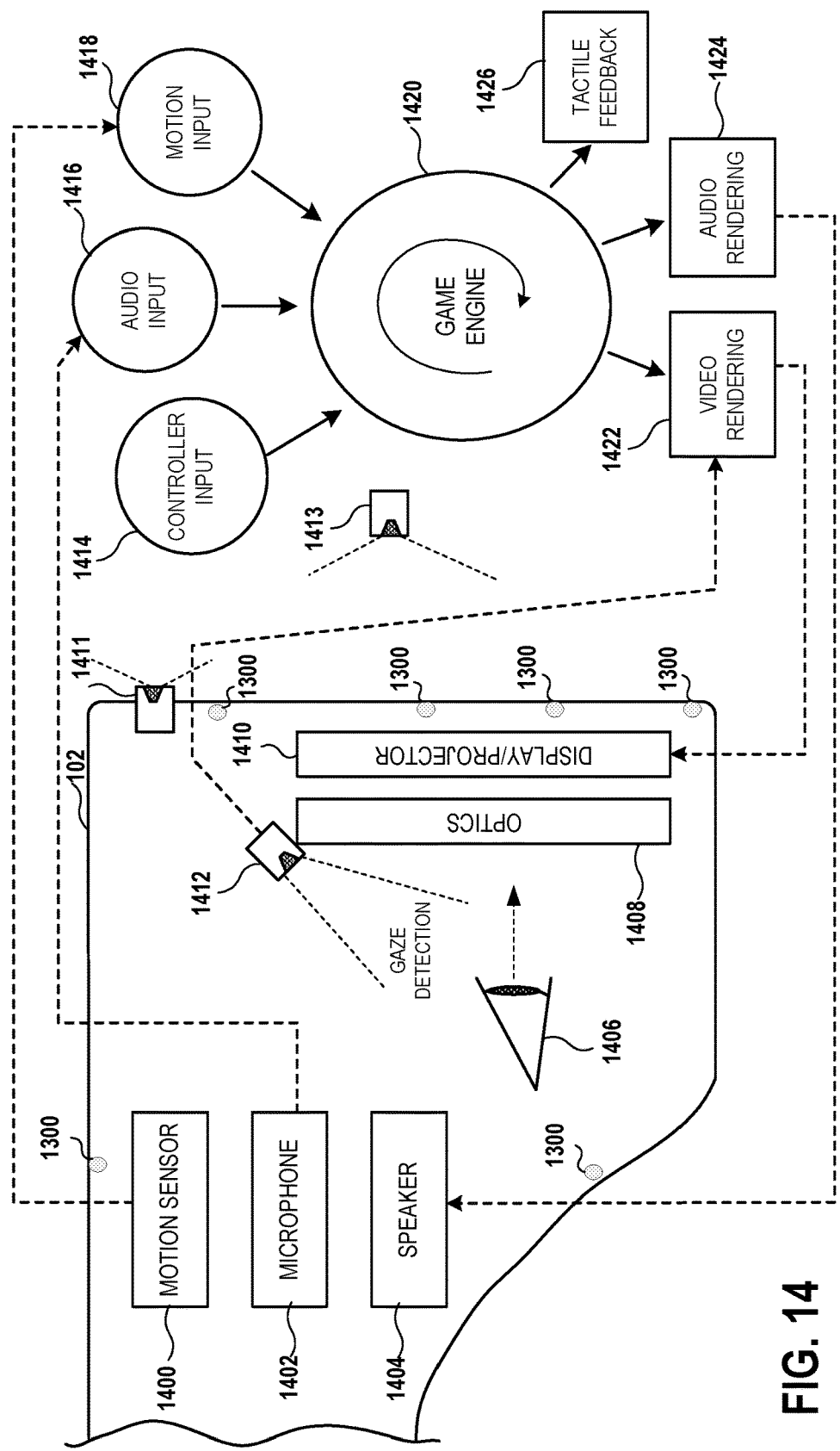
FIG. 14 conceptually illustrates the function of an HMD in conjunction with an executing video game, in accordance with an implementation of the disclosure.

FIG. 14 conceptually illustrates the function of the HMD 102 in conjunction with an executing video game or other application, in accordance with an implementation of the disclosure. The executing video game/application is defined by a game/application engine 1420 which receives inputs to update a game/application state of the video game/application. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated implementation, the game engine receives, by way of example, controller input 1414, audio input 1416 and motion input 1418. The controller input 1414 may be defined from the operation of a gaming controller separate from the HMD 102, such as a handheld gaming controller (e.g. Sony DUALSHOCK®4 wireless controller, Sony PlayStation®Move motion controller) or directional interface object 104. By way of example, controller input 1414 may include directional inputs, button presses, trigger activation, movements, gestures, or other kinds of inputs processed from the operation of a gaming controller. In some implementations, the movements of a gaming controller are tracked through an externally facing camera 1411 of the HMD 102, which provides the location/orientation of the gaming controller relative to the HMD 102. The audio input 1416 can be processed from a microphone 1402 of the HMD 102, or from a microphone included in the image capture device 1413 or elsewhere in the local environment. The motion input 1418 can be processed from a motion sensor 1400 included in the HMD 102, and/or from image capture device 1413 as it captures images of the HMD 102, and/or from externally facing camera 1411 of the HMD 102. The game engine 1420 receives inputs which are processed according to the configuration of the game engine to update the game state of the video game. The game engine 1420 outputs game state data to various rendering modules which process the game state data to define content which will be presented to the user.

In the illustrated implementation, a video rendering module 1422 is defined to render a video stream for presentation on the HMD 102. The video stream may be presented by a display/projector mechanism 1410, and viewed through optics 1408 by the eye 1406 of the user. An audio rendering module 1404 is configured to render an audio stream for listening by the user. In one implementation, the audio stream is output through a speaker 1404 associated with the HMD 102. It should be appreciated that speaker 1404 may take the form of an open air speaker, headphones, or any other kind of speaker capable of presenting audio.

In one implementation, a gaze tracking camera 1412 is included in the HMD 102 to enable tracking of the gaze of the user. The gaze tracking camera captures images of the user's eyes, which are analyzed to determine the gaze direction of the user. In one implementation, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 1412, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 1426 is configured to provide signals to tactile feedback hardware included in either the HMD 102 or another device operated by the user, such as interface object 104. The tactile feedback may take the form of various kinds of tactile sensations, such as vibration feedback, temperature feedback, pressure feedback, etc. The interface object 104 can include corresponding hardware for rendering such forms of tactile feedback.

Figure 15:
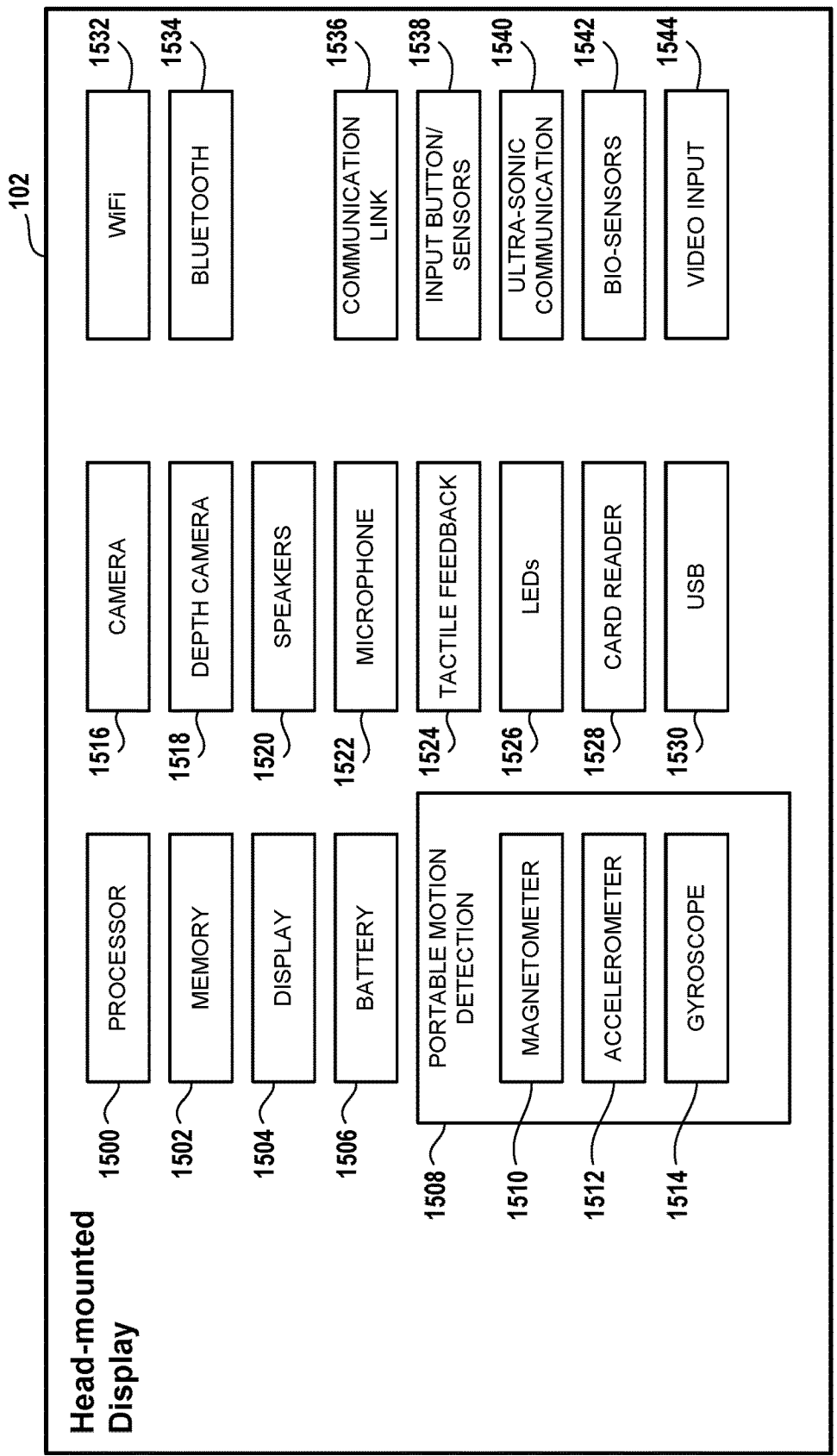
FIG. 15 illustrates components of a head-mounted display, in accordance with an implementation of the disclosure.

With reference to FIG. 15, a diagram illustrating components of a head-mounted display 102 is shown, in accordance with an implementation of the disclosure. The head-mounted display 102 includes a processor 1500 for executing program instructions. A memory 1502 is provided for storage purposes, and may include both volatile and non-volatile memory. A display 1504 is included which provides a visual interface that a user may view. A battery 1506 is provided as a power source for the head-mounted display 102. A motion detection module 1508 may include any of various kinds of motion sensitive hardware, such as a magnetometer 1510, an accelerometer 1512, and a gyroscope 1514.

An accelerometer is a device for measuring acceleration and gravity induced reaction forces. Single and multiple axis models are available to detect magnitude and direction of the acceleration in different directions. The accelerometer is used to sense inclination, vibration, and shock. In one implementation, three accelerometers 1512 are used to provide the direction of gravity, which gives an absolute reference for two angles (world-space pitch and world-space roll).

A magnetometer measures the strength and direction of the magnetic field in the vicinity of the head-mounted display. In one implementation, three magnetometers 1510 are used within the head-mounted display, ensuring an absolute reference for the world-space yaw angle. In one implementation, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one implementation, accelerometer 1512 is used together with magnetometer 1510 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one implementation, three gyroscopes 1514 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1516 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1518 may be included in the head-mounted display 102 for sensing depth information of objects in a real environment.

The head-mounted display 102 includes speakers 1520 for providing audio output. Also, a microphone 1522 may be included for capturing audio from the real environment, including sounds from the ambient environment, speech made by the user, etc. The head-mounted display 102 includes tactile feedback module 1524 for providing tactile feedback to the user. In one implementation, the tactile feedback module 1524 is capable of causing movement and/or vibration of the head-mounted display 102 so as to provide tactile feedback to the user.

LEDs 1526 are provided as visual indicators of statuses of the head-mounted display 102. For example, an LED may indicate battery level, power on, etc. A card reader 1528 is provided to enable the head-mounted display 102 to read and write information to and from a memory card. A USB interface 1530 is included as one example of an interface for enabling connection of peripheral devices, or connection to other devices, such as other portable devices, computers, etc. In various implementations of the head-mounted display 102, any of various kinds of interfaces may be included to enable greater connectivity of the head-mounted display 102.

A WiFi module 1532 is included for enabling connection to the Internet or a local area network via wireless networking technologies. Also, the head-mounted display 102 includes a Bluetooth module 1534 for enabling wireless connection to other devices. A communications link 1536 may also be included for connection to other devices. In one implementation, the communications link 1536 utilizes infrared transmission for wireless communication. In other implementations, the communications link 1536 may utilize any of various wireless or wired transmission protocols for communication with other devices.

Input buttons/sensors 1538 are included to provide an input interface for the user. Any of various kinds of input interfaces may be included, such as buttons, touchpad, joystick, trackball, etc. An ultra-sonic communication module 1540 may be included in head-mounted display 102 for facilitating communication with other devices via ultra-sonic technologies.

Bio-sensors 1542 are included to enable detection of physiological data from a user. In one implementation, the bio-sensors 1542 include one or more dry electrodes for detecting bio-electric signals of the user through the user's skin.

A video input 1544 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various implementations of the disclosure, the head-mounted display 102 may or may not include some of the various aforementioned components. Implementations of the head-mounted display 102 may additionally include other components not presently described, but known in the art, for purposes of facilitating aspects of the present disclosure as herein described.

Figure 16:
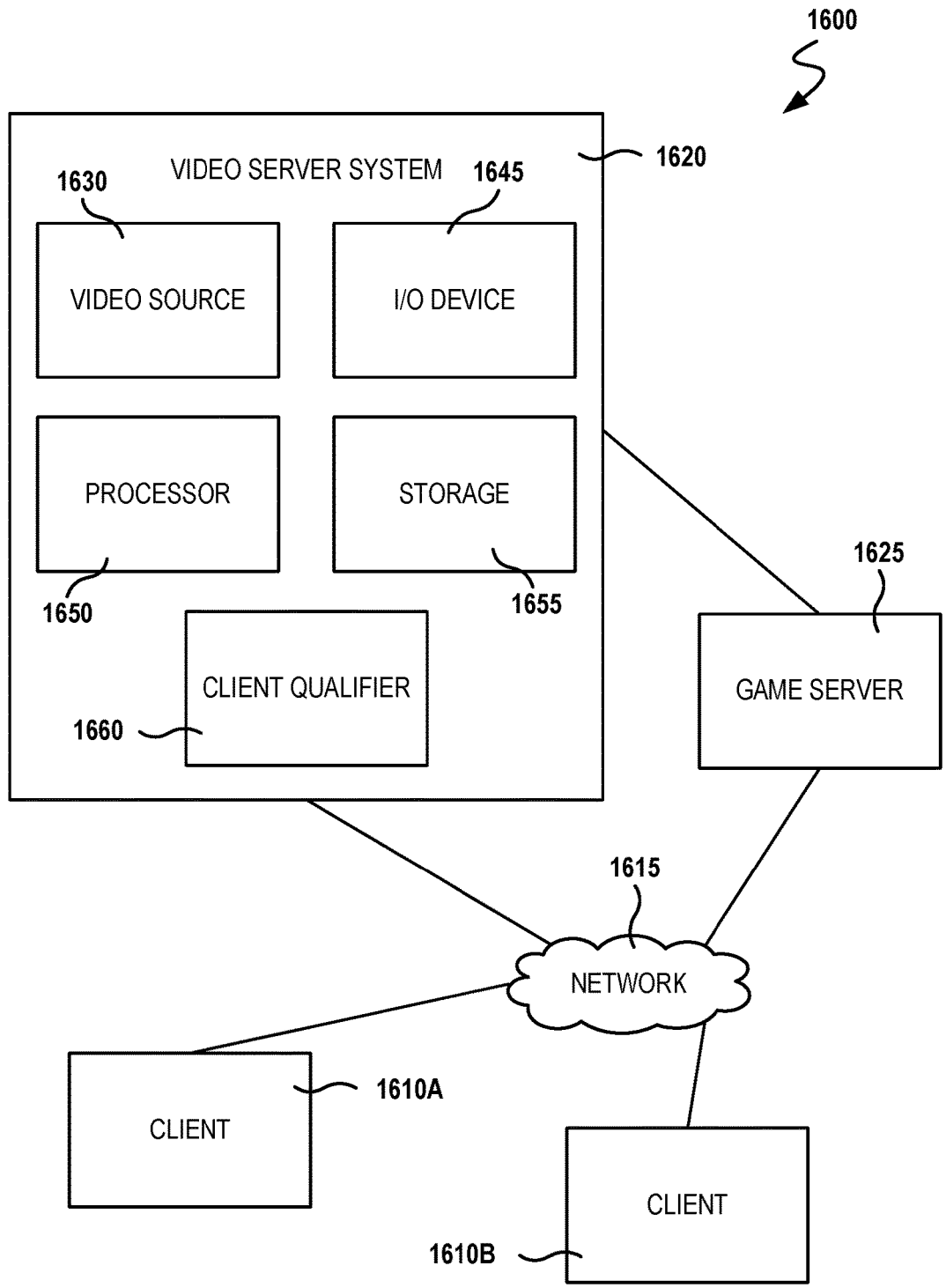
FIG. 16 is a block diagram of a Game System 1600, according to various implementations of the disclosure.

FIG. 16 is a block diagram of a Game System 1600, according to various implementations of the disclosure. Game System 1600 is configured to provide a video stream to one or more Clients 1610 via a Network 1615. Game System 1600 typically includes a Video Server System 1620 and an optional game server 1625. Video Server System 1620 is configured to provide the video stream to the one or more Clients 1610 with a minimal quality of service. For example, Video Server System 1620 may receive a game command that changes the state of or a point of view within a video game, and provide Clients 1610 with an updated video stream reflecting this change in state with minimal lag time. The Video Server System 1620 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative implementations of the disclosure.

Clients 1610, referred to herein individually as 1610A, 1610B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1610 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1610 or on a separate device such as a monitor or television. Clients 1610 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1610 are optionally geographically dispersed. The number of clients included in Game System 1600 may vary widely from one or two to thousands, tens of thousands, or more. As used herein, the term "game player" is used to refer to a person that plays a game and the term "game playing device" is used to refer to a device used to play a game. In some implementations, the game playing device may refer to a plurality of computing devices that cooperate to deliver a game experience to the user. For example, a game console and an HMD may cooperate with the video server system 1620 to deliver a game viewed through the HMD. In one implementation, the game console receives the video stream from the video server system 1620, and the game console forwards the video stream, or updates to the video stream, to the HMD for rendering.

Clients 1610 are configured to receive video streams via Network 1615. Network 1615 may be any type of communication network including, a telephone network, the Internet, wireless networks, powerline networks, local area networks, wide area networks, private networks, and/or the like. In typical implementations, the video streams are communicated via standard protocols, such as TCP/IP or UDP/IP. Alternatively, the video streams are communicated via proprietary standards.

A typical example of Clients 1610 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1610 may, but are not required to, further include systems configured for modifying received video. For example, a Client may be configured to perform further rendering, to overlay one video image on another video image, to crop a video image, and/or the like. For example, Clients 1610 may be configured to receive various types of video frames, such as I-frames, P-frames and B-frames, and to process these frames into images for display to a user. In some implementations, a member of Clients 1610 is configured to perform further rendering, shading, conversion to 3-D, or like operations on the video stream. A member of Clients 1610 is optionally configured to receive more than one audio or video stream. Input devices of Clients 1610 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1610 is generated and provided by Video Server System 1620. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1610 are typically configured to receive inputs from a user. These inputs may include game commands configured to change the state of the video game or otherwise affect game play. The game commands can be received using input devices and/or may be automatically generated by computing instructions executing on Clients 1610. The received game commands are communicated from Clients 1610 via Network 1615 to Video Server System 1620 and/or Game Server 1625. For example, in some implementations, the game commands are communicated to Game Server 1625 via Video Server System 1620. In some implementations, separate copies of the game commands are communicated from Clients 1610 to Game Server 1625 and Video Server System 1620. The communication of game commands is optionally dependent on the identity of the command Game commands are optionally communicated from Client 1610A through a different route or communication channel that that used to provide audio or video streams to Client 1610A.

Game Server 1625 is optionally operated by a different entity than Video Server System 1620. For example, Game Server 1625 may be operated by the publisher of a multiplayer game. In this example, Video Server System 1620 is optionally viewed as a client by Game Server 1625 and optionally configured to appear from the point of view of Game Server 1625 to be a prior art client executing a prior art game engine. Communication between Video Server System 1620 and Game Server 1625 optionally occurs via Network 1615. As such, Game Server 1625 can be a prior art multiplayer game server that sends game state information to multiple clients, one of which is game server system 1620. Video Server System 1620 may be configured to communicate with multiple instances of Game Server 1625 at the same time. For example, Video Server System 1620 can be configured to provide a plurality of different video games to different users. Each of these different video games may be supported by a different Game Server 1625 and/or published by different entities. In some implementations, several geographically distributed instances of Video Server System 1620 are configured to provide game video to a plurality of different users. Each of these instances of Video Server System 1620 may be in communication with the same instance of Game Server 1625. Communication between Video Server System 1620 and one or more Game Server 1625 optionally occurs via a dedicated communication channel. For example, Video Server System 1620 may be connected to Game Server 1625 via a high bandwidth channel that is dedicated to communication between these two systems.

Video Server System 1620 comprises at least a Video Source 1630, an I/O Device 1645, a Processor 1650, and non-transitory Storage 1655. Video Server System 1620 may include one computing device or be distributed among a plurality of computing devices. These computing devices are optionally connected via a communications system such as a local area network.

Video Source 1630 is configured to provide a video stream, e.g., streaming video or a series of video frames that form a moving picture. In some implementations, Video Source 1630 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1625. Game Server 1625 may maintain a copy of the state of the game based on game commands received from multiple players using geographically disperse clients. In these cases, the game state is provided by Game Server 1625 to Video Source 1630, wherein a copy of the game state is stored and rendering is performed. Game Server 1625 may receive game commands directly from Clients 1610 via Network 1615, and/or may receive game commands via Video Server System 1620.

Video Source 1630 typically includes rendering logic, e.g., hardware, firmware, and/or software stored on a computer readable medium such as Storage 1655. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1610. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative implementations Video Source 1630 includes a video recording device such as a camera. This camera may be used to generate delayed or live video that can be included in the video stream of a computer game. The resulting video stream optionally includes both rendered images and images recorded using a still or video camera. Video Source 1630 may also include storage devices configured to store previously recorded video to be included in a video stream. Video Source 1630 may also include motion or positioning sensing devices configured to detect motion or position of an object, e.g., person, and logic configured to determine a game state or produce video-based on the detected motion and/or position.

Video Source 1630 is optionally configured to provide overlays configured to be placed on other video. For example, these overlays may include a command interface, log in instructions, messages to a game player, images of other game players, video feeds of other game players (e.g., webcam video). In implementations of Client 1610A including a touch screen interface or a gaze detection interface, the overlay may include a virtual keyboard, joystick, touch pad, and/or the like. In one example of an overlay a player's voice is overlaid on an audio stream. Video Source 1630 optionally further includes one or more audio sources.

In implementations wherein Video Server System 1620 is configured to maintain the game state based on input from more than one player, each player may have a different point of view comprising a position and direction of view. Video Source 1630 is optionally configured to provide a separate video stream for each player based on their point of view. Further, Video Source 1630 may be configured to provide a different frame size, frame data size, and/or encoding to each of Client 1610. Video Source 1630 is optionally configured to provide 3-D video.

I/O Device 1645 is configured for Video Server System 1620 to send and/or receive information such as video, commands, requests for information, a game state, gaze information, device motion, device location, user motion, client identities, player identities, game commands, security information, audio, and/or the like. I/O Device 1645 typically includes communication hardware such as a network card or modem. I/O Device 1645 is configured to communicate with Game Server 1625, Network 1615, and/or Clients 1610.

Processor 1650 is configured to execute logic, e.g. software, included within the various components of Video Server System 1620 discussed herein. For example, Processor 1650 may be programmed with software instructions in order to perform the functions of Video Source 1630, Game Server 1625, and/or a Client Qualifier 1660. Video Server System 1620 optionally includes more than one instance of Processor 1650. Processor 1650 may also be programmed with software instructions in order to execute commands received by Video Server System 1620, or to coordinate the operation of the various elements of Game System 1600 discussed herein. Processor 1650 may include one or more hardware device. Processor 1650 is an electronic processor.

Storage 1655 includes non-transitory analog and/or digital storage devices. For example, Storage 1655 may include an analog storage device configured to store video frames. Storage 1655 may include a computer readable digital storage, e.g. a hard drive, an optical drive, or solid state storage. Storage 1615 is configured (e.g. by way of an appropriate data structure or file system) to store video frames, artificial frames, a video stream including both video frames and artificial frames, audio frame, an audio stream, and/or the like. Storage 1655 is optionally distributed among a plurality of devices. In some implementations, Storage 1655 is configured to store the software components of Video Source 1630 discussed elsewhere herein. These components may be stored in a format ready to be provisioned when needed.

Video Server System 1620 optionally further comprises Client Qualifier 1660. Client Qualifier 1660 is configured for remotely determining the capabilities of a client, such as Clients 1610A or 1610B. These capabilities can include both the capabilities of Client 1610A itself as well as the capabilities of one or more communication channels between Client 1610A and Video Server System 1620. For example, Client Qualifier 1660 may be configured to test a communication channel through Network 1615.

Client Qualifier 1660 can determine (e.g., discover) the capabilities of Client 1610A manually or automatically. Manual determination includes communicating with a user of Client 1610A and asking the user to provide capabilities. For example, in some implementations, Client Qualifier 1660 is configured to display images, text, and/or the like within a browser of Client 1610A. In one implementation, Client 1610A is an HMD that includes a browser. In another implementation, client 1610A is a game console having a browser, which may be displayed on the HMD. The displayed objects request that the user enter information such as operating system, processor, video decoder type, type of network connection, display resolution, etc. of Client 1610A. The information entered by the user is communicated back to Client Qualifier 1660.

Automatic determination may occur, for example, by execution of an agent on Client 1610A and/or by sending test video to Client 1610A. The agent may comprise computing instructions, such as java script, embedded in a web page or installed as an add-on. The agent is optionally provided by Client Qualifier 1660. In various implementations, the agent can find out processing power of Client 1610A, decoding and display capabilities of Client 1610A, lag time reliability and bandwidth of communication channels between Client 1610A and Video Server System 1620, a display type of Client 1610A, firewalls present on Client 1610A, hardware of Client 1610A, software executing on Client 1610A, registry entries within Client 1610A, and/or the like.

Client Qualifier 1660 includes hardware, firmware, and/or software stored on a computer readable medium. Client Qualifier 1660 is optionally disposed on a computing device separate from one or more other elements of Video Server System 1620. For example, in some implementations, Client Qualifier 1660 is configured to determine the characteristics of communication channels between Clients 1610 and more than one instance of Video Server System 1620. In these implementations the information discovered by Client Qualifier can be used to determine which instance of Video Server System 1620 is best suited for delivery of streaming video to one of Clients 1610.

Implementations of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above implementations in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present implementations are to be considered as illustrative and not restrictive, and the disclosure is not to be limited to the details given herein, but may be modified within the scope and equivalents of the present disclosure.

What is claimed is:

1. A method, comprising:
    receiving, from a controller device, controller input that identifies a pose of a user's hand, including identifying postures of a plurality of fingers of the user's hand;
    determining a degree of similarity of the controller input to a predefined target input, wherein determining the degree of similarity includes determining deviations of values of the controller input, that identify the postures of the plurality of fingers, from corresponding values of the predefined target input;
    rendering in a virtual space a virtual hand that corresponds to the controller device,
    wherein when the degree of similarity exceeds a predefined threshold, then, in response the virtual hand is animated so that a pose of the virtual hand transitions to a predefined hand pose, such that postures of fingers of the virtual hand corresponding to the plurality of fingers of the user's hand are animated transitioning to predefined finger postures of the predefined hand pose, wherein the pose of the user's hand approximates the predefined hand pose when the degree of similarity exceeds the predefined threshold, and
    wherein when the degree of similarity does not exceed the predefined threshold, then the virtual hand is rendered so that the pose of the virtual hand dynamically changes in response to changes in the controller input.

2. The method of claim 1, wherein the pose of the virtual hand is defined by postures of virtual fingers of the virtual hand, that are independent of a location and orientation of the virtual hand in the virtual space, wherein the predefined hand pose defines predefined postures for the virtual fingers of the virtual hand.

3. The method of claim 2, wherein the postures of the virtual fingers are defined by amounts of one or more of flexion, extension, abduction, adduction, and/or circumduction of the virtual fingers.

4. The method of claim 1, wherein rendering the virtual hand so that the pose of the virtual hand dynamically changes in response to changes in the controller input includes changing the posture of at least one virtual finger of the virtual hand in response to a change in the controller input that detects a change in posture of at least one of the plurality of fingers.

5. The method of claim 1, wherein the rendering of the predefined hand pose is maintained for a duration when the degree of similarity continues to exceed the predefined threshold, such that changes in the controller input that do not cause the degree of similarity to not exceed the predefined threshold do not result in changes in the pose of the virtual hand.

6. The method of claim 1, wherein the pose of the user's hand is defined by postures of fingers of the user's hand, that are independent of a location and orientation of the user's hand in a local environment, and wherein the controller input identifies postures of fingers of the user's hand.

7. The method of claim 6, wherein the postures of the fingers of the user's hand are defined by amounts of one or more of flexion, extension, abduction, adduction, and/or circumduction of the fingers of the user's hand.

8. A non-transitory computer readable medium having program instruction embodied thereon that, when executed by at least one computing device, cause said at least one computing device to perform a method including the following operations:
   receiving, from a controller device, controller input that identifies a pose of a user's hand, including identifying postures of a plurality of fingers of the user's hand;
   determining a degree of similarity of the controller input to a predefined target input, wherein determining the degree of similarity includes determining deviations of values of the controller input, that identify the postures of the plurality of fingers, from corresponding values of the predefined target input;
   rendering in a virtual space a virtual hand that corresponds to the controller device,
   wherein when the degree of similarity exceeds a predefined threshold, then, in response the virtual hand is animated so that a pose of the virtual hand transitions to a predefined hand pose, such that postures of fingers of the virtual hand corresponding to the plurality of fingers of the user's hand are animated transitioning to predefined finger postures of the predefined hand pose, wherein the pose of the user's hand approximates the predefined hand pose when the degree of similarity exceeds the predefined threshold, and
   wherein when the degree of similarity does not exceed the predefined threshold, then the virtual hand is rendered so that the pose of the virtual hand dynamically changes in response to changes in the controller input.

9. The non-transitory computer readable medium of claim 8, wherein the pose of the virtual hand is defined by postures of virtual fingers of the virtual hand, that are independent of a location and orientation of the virtual hand in the virtual space, wherein the predefined hand pose defines predefined postures for the virtual fingers of the virtual hand.

10. The non-transitory computer readable medium of claim 9, wherein the postures of the virtual fingers are defined by amounts of one or more of flexion, extension, abduction, adduction, and/or circumduction of the virtual fingers.

11. The non-transitory computer readable medium of claim 8, wherein rendering the virtual hand so that the pose of the virtual hand dynamically changes in response to changes in the controller input includes changing the posture of at least one virtual finger of the virtual hand in response to a change in the controller input that detects a change in posture of at least one of the plurality of fingers.

12. The non-transitory computer readable medium of claim 8, wherein the rendering of the predefined hand pose is maintained for a duration when the degree of similarity continues to exceed the predefined threshold, such that changes in the controller input that do not cause the degree of similarity to not exceed the predefined threshold do not result in changes in the pose of the virtual hand.

13. The method of claim 8, wherein the pose of the user's hand is defined by postures of fingers of the user's hand, that are independent of a location and orientation of the user's hand in a local environment, and wherein the controller input identifies postures of fingers of the user's hand.

14. The method of claim 13, wherein the postures of the fingers of the user's hand are defined by amounts of one or more of flexion, extension, abduction, adduction, and/or circumduction of the fingers of the user's hand.

15. A system, comprising:
   a controller device that generates controller input that identifies a pose of a user's hand, including identifying postures of a plurality of fingers of the user's hand;
   a computing device that determines a degree of similarity of the controller input to a predefined target input, wherein determining the degree of similarity includes determining deviations of values of the controller input, that identify the postures of the plurality of fingers, from corresponding values of the predefined target input, and
   wherein the computing device renders in a virtual space a virtual hand that corresponds to the controller device,
   wherein when the degree of similarity exceeds a predefined threshold, then, in response the virtual hand is animated so that a pose of the virtual hand transitions to a predefined hand pose, such that postures of fingers of the virtual hand corresponding to the plurality of fingers of the user's hand are animated transitioning to predefined finger postures of the predefined hand pose, wherein the pose of the user's hand approximates the predefined hand pose when the degree of similarity exceeds the predefined threshold, and
   wherein when the degree of similarity does not exceed the predefined threshold, then the virtual hand is rendered so that the pose of the virtual hand dynamically changes in response to changes in the controller input.

16. The system of claim 15, wherein the pose of the virtual hand is defined by postures of virtual fingers of the virtual hand, that are independent of a location and orientation of the virtual hand in the virtual space, wherein the predefined hand pose defines predefined postures for the virtual fingers of the virtual hand.

17. The system of claim 16, wherein the postures of the virtual fingers are defined by amounts of one or more of flexion, extension, abduction, adduction, and/or circumduction of the virtual fingers.

18. The system of claim 15, wherein rendering the virtual hand so that the pose of the virtual hand dynamically changes in response to changes in the controller input includes changing the posture of at least one virtual finger of the virtual hand in response to a change in the controller input that detects a change in posture of at least one of the plurality of fingers.

19. The system of claim 15, wherein the rendering of the predefined hand pose is maintained for a duration when the degree of similarity continues to exceed the predefined threshold, such that changes in the controller input that do not cause the degree of similarity to not exceed the predefined threshold do not result in changes in the pose of the virtual hand.

20. The system of claim 15, wherein the pose of the user's hand is defined by postures of fingers of the user's hand, that are independent of a location and orientation of the user's hand in a local environment, and wherein the controller input identifies postures of fingers of the user's hand.

21. The system of claim 20, wherein the postures of the fingers of the user's hand are defined by amounts of one or more of flexion, extension, abduction, adduction, and/or circumduction of the fingers of the user's hand.

* * * * *